United States Patent [19]

Yoshinaga

[11] Patent Number: 5,608,015
[45] Date of Patent: Mar. 4, 1997

[54] PROCESSES FOR PRODUCING CYCLODEXTRIN DERIVATIVES AND POLYMERS CONTAINING IMMOBILIZED CYCLODEXTRIN THEREIN

[75] Inventor: Masanobu Yoshinaga, Tokyo, Japan

[73] Assignee: Toppan Printing Co., Ltd., Tokyo, Japan

[21] Appl. No.: 237,725

[22] Filed: May 4, 1994

Related U.S. Application Data

[62] Division of Ser. No. 842,156, filed as PCT/JP91/01011, Jul. 29, 1991, published as WO92/09637, Jun. 11, 1992, abandoned.

[30] Foreign Application Priority Data

Nov. 30, 1990 [JP] Japan .................................. 2-335531
Nov. 30, 1990 [JP] Japan .................................. 2-335532

[51] Int. Cl.$^6$ .................................................. C08B 37/16
[52] U.S. Cl. ................................................. 526/75; 536/103
[58] Field of Search ................................ 526/75; 536/103

[56] References Cited

U.S. PATENT DOCUMENTS

| | | |
|---|---|---|
| 4,274,985 | 6/1981 | Szejtli et al. . |
| 4,357,468 | 11/1982 | Szejtli et al. ............................. 536/56 |
| 5,096,893 | 3/1992 | Pitha et al. ............................. 536/103 |
| 5,173,481 | 12/1992 | Pitha et al. ............................. 536/103 |

FOREIGN PATENT DOCUMENTS

| | | |
|---|---|---|
| 54-61289 | 5/1979 | Japan . |
| 55-13796 | 1/1980 | Japan . |
| 55-75402 | 6/1980 | Japan . |
| 57-57701 | 4/1982 | Japan . |
| 59-227906 | 12/1984 | Japan . |
| 61-129566 | 6/1986 | Japan . |
| 63-314201 | 12/1988 | Japan . |

OTHER PUBLICATIONS

Croft et al. "Synthesis of Chemically Modified Cyclodextrins", Tetrahedron vol. 39, No. 9, pp. 1417–1474 (1983).
Knowles, Symmetrical Triamino–per–O–methyl–α–cyclodextrin: Preparation and Characterization of Primary Trisubstitutel α–Cyclodextrins, JACS, 101, 25 p. 7630–7631 (1979).

Primary Examiner—Jeffrey C. Mullis
Attorney, Agent, or Firm—Armstrong, Westerman, Hattori, McLeland & Naughton

[57] ABSTRACT

A process for producing a polymer containing immobilized cyclodextrin comprising reacting a cyclodextrin derivative with an acid halide monomer of an α,β-unsaturated acid or a derivative thereof or with an α,β-unsaturated acid monomer having a terminal isocyanate group or a derivative thereof, said cyclodextrin derivative being obtained by reacting cyclodextrin with a carbonyl halide, an acid anhydride or a compound of one of the following formulas, etc.

A polymer having immobilized cyclodextrin can be obtained wherein one unit of the cyclodextrin derivative is immobilized with respect to the monomer and which shows high reactivity in the polymer reaction.

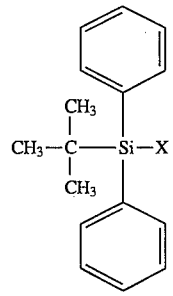

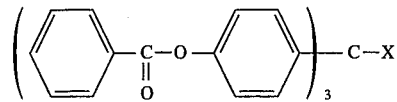

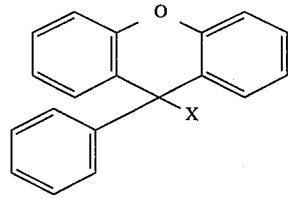

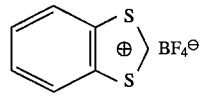

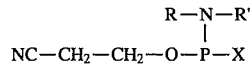

(X represents Cl, Br, or I)

9 Claims, 12 Drawing Sheets

(1)

(2)

(3)

[13]

[14]　　(F)

(4)

[15]

[16]　　(6)

(5)

(6)

(7)

(8)-1

(8)-2

(9)

(12)

(13)

I.

methacryloyl isocyanate      (A)

(CD monomer (II))

(CD polymer (III))

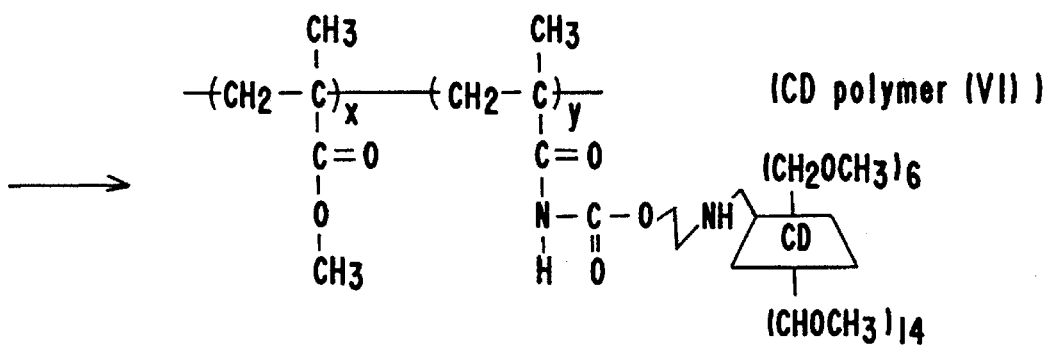
FIG.2D
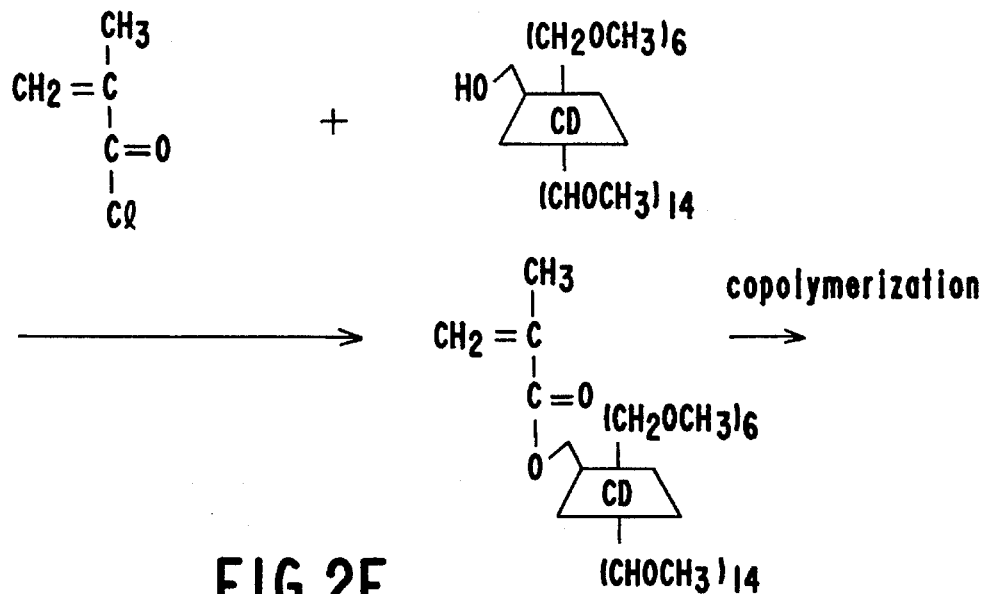
FIG.2E
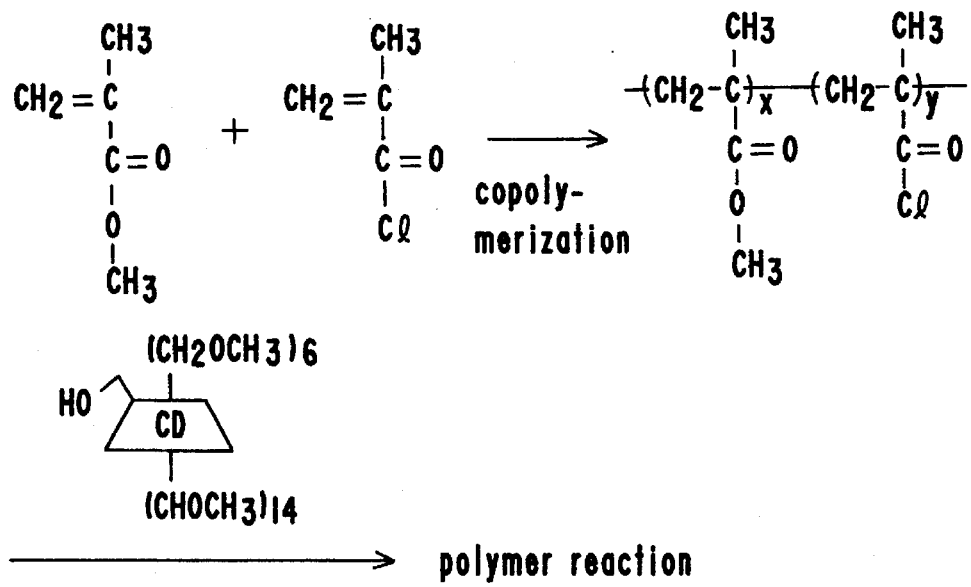

PROCESSES FOR PRODUCING CYCLODEXTRIN DERIVATIVES AND POLYMERS CONTAINING IMMOBILIZED CYCLODEXTRIN THEREIN

This application is a divisional of application Ser. No. 07/842,156, filed as PCT/JP91/01011, Jul. 29, 1991 published as WO92/09637, Jun. 11, 1992 now abandoned.

TECHNICAL FIELD

This invention relates to a process for producing cyclodextrin derivatives, and to a process for producing polymers containing immobilized cyclodextrin therein. More specifically, this invention relates to a process for producing cyclodextrin derivatives, as well as a process for producing polymers containing immobilized cyclodextrin therein by which one unit of cyclodextrin can always be immobilized with respect to one basic monomer unit.

BACKGROUND ART

Cyclodextrin is a cyclic oligosaccharide in which at least six glucose units combine together through $\alpha$-1,4 linkage, and those having 6, 7 or 8 glucose units are particularly well known. There are many documents known regarding their applications. All these known applications utilize the selective inclusion ability of cyclodextrin due brought about by the hydrophobic nature of the inside of the cyclodextrin ring and also by the fact that the size of said ring depends on the number of glucose units; cyclodextrin is currently used as a packing for chromatographic separation, as a catalyst, as a masking agent for the off-taste or foul smell of foods, as an agent for retaining volatile materials or for solubilizing sparingly soluble materials, and the like.

One will readily anticipate that such selective inclusion ability of cyclodextrin provides an effective means for separating and extracting hydrophobic materials; however, cyclodextrin is water-soluble, and therefore, cyclodextrin is not suitable for use as a separating or extracting agent since it is difficult not only to separate inclusion compounds from the reaction mixture but also to separate the included compound from cyclodextrin.

If cyclodextrin is immobilized on a polymer, etc. with retaining its inclusion ability, it may be packed in a column and a component of interest may be easily separated, recovered or removed by an adsorption/desorption procedure or by a chromatographic procedure as with ion exchange resins or activated carbon.

Various approaches have been attempted to immobilize cyclodextrin; however, all of them have been unsatisfactory for effective use in industry, because of low utilizability of the immobilized cyclodextrin, insufficient selectivity due to the adsorption of hydrophobic materials by the matrix polymer having immobilized cyclodextrin, and the great cost involved in the preparation thereof.

For example, Examined Japanese Patent Publication Nos. 27083/1980, 41643/1980 and 15806/1981 describe processes for producing polystyrene based polymers containing cyclodextrin derivatives. According to these processes, one unit of cyclodextrin derivative can always be immobilized with respect to one styrene monomer unit. In the case of polymer however, the reactivity thereof is low and the extent of immobilization is not sufficient. Further, Japanese Unexamined Patent Publication Nos. 75402/1980 and 314201/1988 disclose methods in which cyclodextrin is immobilized by subjecting it to a polymer reaction either at a site of glycidyl group or at a site where its epoxy ring is opened. However, even in these methods, the reaction must be carried out for a long time period in order to bind an adequate amount of cyclodextrin to the matrix. Further, the ratio of cyclodextrin actually immobilized is only a part of the total amount charged, and it is impossible to ensure that one cyclodextrin molecule is always immobilized per monomer unit and there have been economic problems to utilize excellent inclusion ability of cyclodextrin for various purposes.

An object, therefore, of the present invention is to provide a process for producing a CD derivative which can be used as a starting material for producing a polymer containing immobilized CD and which has only one protected hydroxyl group among several hydroxyl groups in CD.

Another object of the present invention is to provide a process for producing a polymer containing immobilized cyclodextrin which has one unit of immobilized cyclodextrin derivative per monomer unit, for example, an $\alpha,\beta$-unsaturated acid halide or an $\alpha,\beta$-unsaturated acid having a terminal isocyanate group and which shows high reactivity even in the polymer reaction.

DISCLOSURE OF INVENTION

Figure 1A:
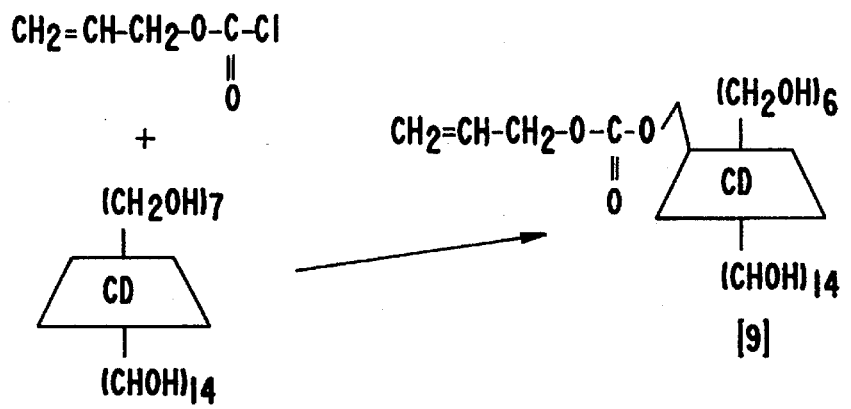
FIGS. 1A-Q represent is a flow chart showing reactions performed in accordance with the present invention.

The present inventor has conducted intensive studies and found that the above-stated objects of the present invention can be attained by: a process for producing a cyclodextrin derivative which comprises introducing a protective group into only one of the primary hydroxyl groups present in cyclodextrin by reacting it with a carboxylic acid halide, an acid anhydride or any one of the compounds represented by the formulas [1]–[5] shown below or the compounds represented by the formulas [6] and [7] shown below, or by first iodinating one of the methylol groups in cyclodextrin and then reacting the product with an alcoholamine, a mercaptoalcohol or glycolic acid or any one of the compounds represented by formulas [8]–[10] shown below; or by a process for producing a polymer containing immobilized cyclodextrin therein which comprises a step of reacting a cyclodextrin derivative with an acid halide monomer of an $\alpha,\beta$-unsaturated acid or a derivative thereof or with an $\alpha,\beta$-unsaturated acid monomer having a terminal isocyanate group or a derivative thereof, characterized in that one unit of cyclodextrin or a derivative thereof is immobilized with respect to said monomer unit by using a cyclodextrin derivative wherein only one of the primary hydroxyl groups in cyclodextrin is protected.

Formula [1]

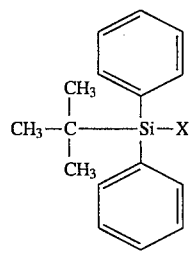

(X represents Cl, Br or I)

-continued

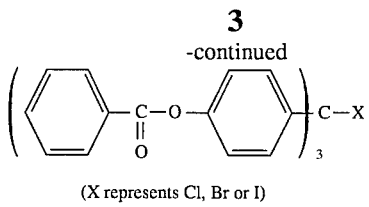

Formula [2]

(X represents Cl, Br or I)

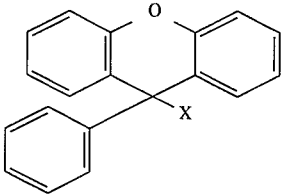

(X represents Cl, Br or I)

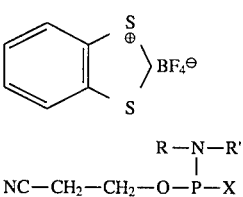    Formula [3]

Formula [4]

R—N—R'
|
NC—CH₂—CH₂—O—P—X                Formula [5]

(wherein R and R' each represents an isopropyl group, a phenyl group or a benzyl group; and X represents Cl, Br or I)

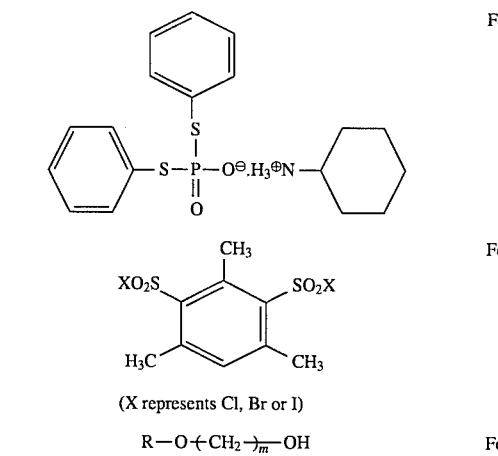    Formula [6]

Formula [7]

(X represents Cl, Br or I)

R—O—(CH₂)ₘ—OH                Formula [8]

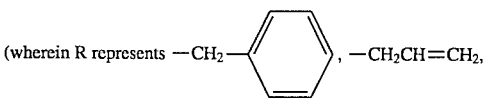

(wherein R represents —CH₂—C₆H₅, —CH₂CH=CH₂,

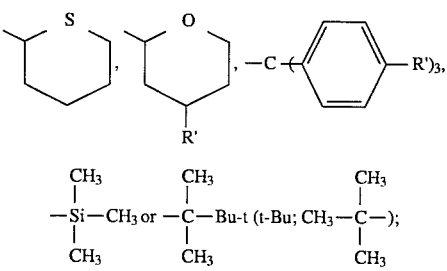

R' represents a hydrogen atom or —OCH₃; and m represents an integer of 2–10, preferably 2–5 )

R—((CH₂))ₘOH                Formula [9]

(wherein R represents

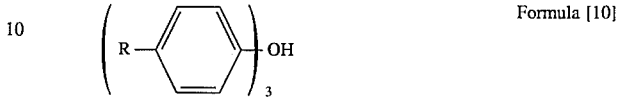

and m represents an integer of 1–10)

Formula [10]

$$\left( R-\underset{}{\underline{\phantom{XXX}}}-\right)_3 OH$$

(wherein R represents a hydrogen atom or —OCH₃)

The present invention will be described below in detail.

In the process of the present invention for producing cyclodextrin derivatives, cyclodextrin (abbreviated as "CD", hereinafter) is reacted with a carboxylic acid halide. The carboxylic acid halide used here is preferably a carboxylic acid chloride. Concrete examples of acid chlorides, are allyloxycarbonyl chloride, p-nitrophenoxycarbonyl chloride, benzyloxycarbonyl chloride, benzylthiocarbonyl chloride, trichloroethoxycarbonyl chloride, tribromoethoxycarbonyl chloride, etc.

By reacting CD with a carboxylic acid halide or any one of the compounds of the formulas [1]–[5] or of the compounds represented by the following formulas [6] and [7] in the presence of a base such as pyridine, imidazole, diisopropylethylamine or a mixed solvent containing either one of them, one protective group can be introduced into CD in one step.

Selective iodination of a methylol group in CD in the process of the present invention for producing CD derivatives can be accomplished by, for example, reacting CD with paratoluenesulfonyl chloride to convert one of the methylol groups into a tosyl group and thereafter reacting the product with potassium iodide, etc.

After this iodination, said CD product can be reacted with an alcoholamine, a mercaptoalcohol or glycolic acid which have hydroxyl group (s) capable of being protected. Typical examples of such compounds include ethanolamine, mercaptoethyl alcohol and hydroxyacetic acid, as well as those having elongated methylene chains (e.g. propanolamine, butanolamine, mercaptopropylalcohol, etc.), and various other compounds having further extended chains as an ethyleneoxy chain in the compounds mentioned above, such as hydroxyethyl ethanolamine.

Examples of protective groups which can be used to protect a hydroxyl group include:

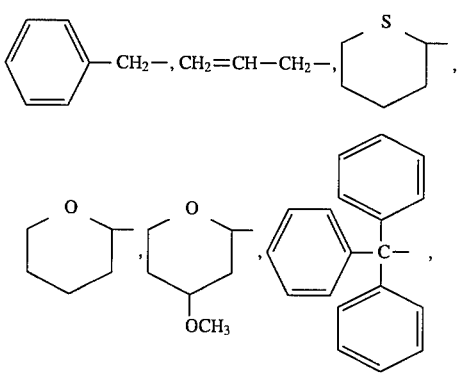

-continued

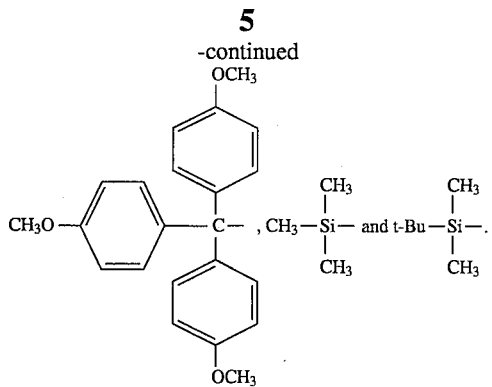

Further, in the present invention, the remaining hydroxyl groups other than the protected hydroxyl group in the CD derivative may be etherified or esterified and thereafter, the protective group moiety may be replaced by a reactive group such as a hydroxyl group. Thus, a monohydroxy-CD derivative can be obtained which can be supported on a polymer without crosslinking therein and which yet allow easy quantitative determination since only one unit will react with a polymer unit.

Etherification or esterification may be achieved by reacting a protected CD derivative with an alkyl halide such as methyl iodide, an acid chloride such as benzoyl chloride or an acid anhydride such as acetic anhydride.

Thereafter, hydrogenation is effected using Pd/C as a catalyst or, alternatively, the aforementioned protective group is removed using TsOH in a water/ethanol system, or a chloroform/HCl system, or $(n-C_4H_9)_4N^+F^-$ in THF, or $HgCl_2$ in a water/ethanol system or $AgNO_3$, etc. in a water/methanol system, to give a free hydroxyl group. Thus, monohydroxy-CD having a single hydroxyl group can be obtained.

The CD used in the present invention may be either one of α-CD, β-CD, γ-CD, etc.

In the present invention, monohydroxy-CD is reacted with an acid halide monomer of α,β-unsaturated acid or a derivative thereof or of an α,β-unsaturated acid monomer having a terminal isocyanate group or a derivative thereof, so that one unit of CD derivative can be immobilized per unit of said monomer. Examples of such α,β-unsaturated acids which may be mentioned are acrylic acid, methacrylic acid, etc. By polymerizing these monomers or copolymerizing them with methyl methacrylate, etc. after reacting them with monohydroxy-CD in the manner described above, a polymer having immobilized CD can be produced. Alternatively, after a copolymer containing said acid halide is synthesized, the resultant product is subjected to polymer reaction with monohydroxy-CD to immobilize CD.

An example of the reaction for the synthesis of a CD derivative to be used in producing a polymer of the present invention is shown below.

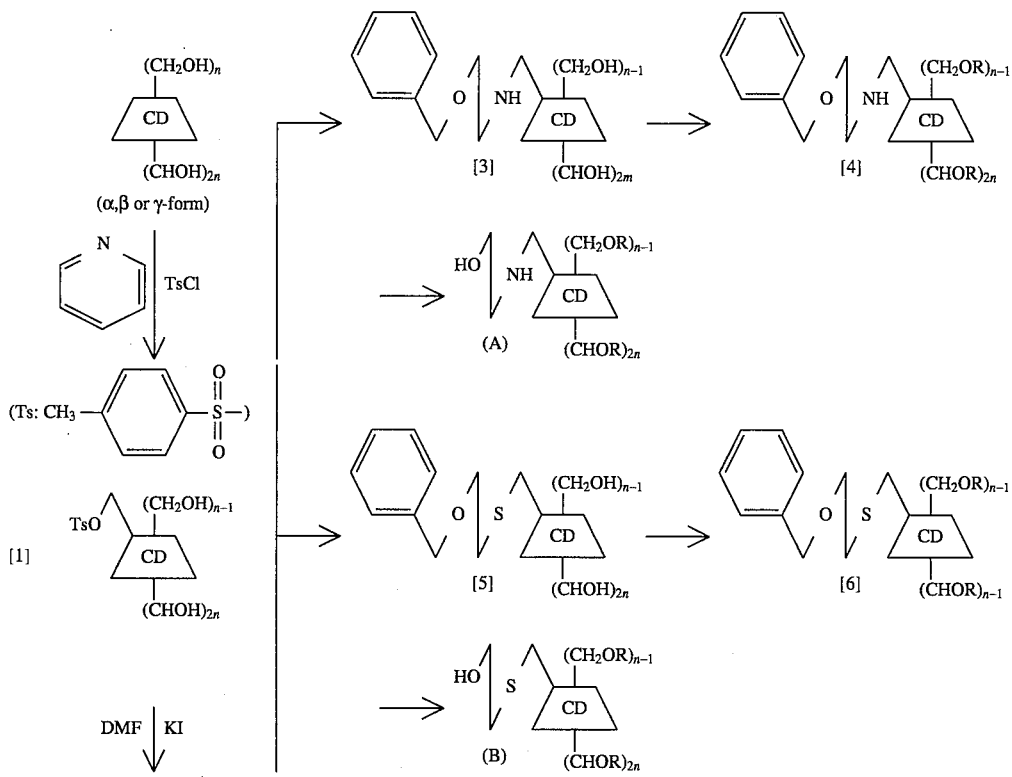

-continued

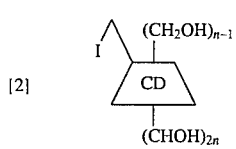
[2]

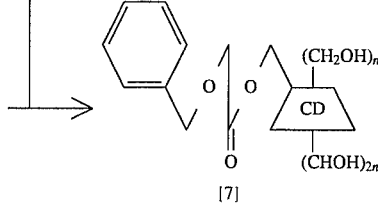
[7]

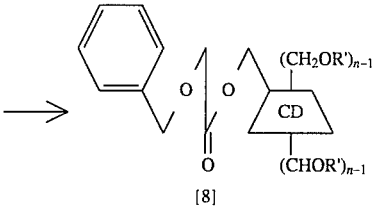
[8]

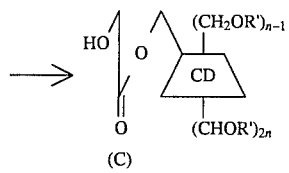
(C)

(wherein R represents $CH_3-$, $CH_3-\underset{\underset{O}{\|}}{C}-CH_2=CH-CH_2-$ etc.; R' represents $CH_3-\underset{\underset{O}{\|}}{C}-$ and the like; and n represents 6($\alpha$-CD), 7($\beta$-CD) or 8($\gamma$-CD).

The above reactions are performed specifically as follows:

1. Synthesis of Compound [2]

β-CD (n=7) is dissolved in pyridine at room temperature and to the resulting mixture, paratoluenesulfonyl chloride dissolved in pyridine is added dropwise at 20° C. or below. After the dropwise addition, the mixture is stirred for one day at room temperature. After the reaction is complete, pyridine is distilled off at a temperature not exceeding 40° C. under reduced pressure and the residue is reprecipitated from a large amount of acetone, the precipitate is collected and recrystallized three times from water to give Compound [1] (yield: 25%).

Compound [1] thus obtained is dissolved in DMF and reacted with KI for one day at 70°–80° C. After the reaction, DMF is distilled off under reduced pressure and the residue is reprecipitated from a large amount of acetone. The precipitate is collected and recrystallized from n-butanol/ethanol/water to give Compound [2] (yield: 60%).

2. Synthesis of Compound (A) (R is $CH_3-$)

In the next step, separately synthesized benzyloxyethanolamine and Compound [2] are reacted in DMF at 60°–70° C. for 8 h and, after the reaction, DMF is distilled off under reduced pressure and the residue is reprecipitated from a large amount of diethyl ether. The precipitate is washed successively and thoroughly with diethyl ether, acetone and water, then vacuum dried to yield Compound [3] (yield: 85%).

Then, Compound [3] is dissolved in DMF and NaH is added at 0°–5° C. under nitrogen stream, followed by stirring at that temperature for 2 h. Then, methyl iodide is added with shielding from light and, thereafter, reaction is continued at room temperature for one day. After the reaction is complete, the mixture is filtered and DMF is distilled off under reduced pressure. A small amount of ethanol is added to the residue, followed by reprecipitation from a large amount of water. The precipitate is washed thoroughly with water and vacuum dried to give Compound [4] (yield: 40%).

Compound [4] is dissolved in ethanol and subjected to hydrogenation (room temperature; pressure: 4–5 kg/cm²) in the presence of 5% Pd/C. The reaction is discontinued at a time point when no decrease In the hydrogen pressure is observed more and, following filtration, ethanol is distilled off under reduced pressure. The residue is reprecipitated from a large amount of water/methanol to afford Compound (A) (yield: 90%).

3. Synthesis of Compound (B) (R is $CH_3-\underset{\underset{O}{\|}}{C}-$)

Separately synthesized mercaptobenzyloxy ethanol and powdery NaOH (or $Na_2CO_3$) are added to DMF and the reaction is performed at 80° C. for 2 h. After the reaction, the mixture is held at 40°–50° C. and a DMF solution of Compound [2] is added to the mixture. After the addition, the mixture is stirred at 80° C. for one day. Thereafter, the mixture is allowed to cool, DMF is distilled off under reduced pressure, and the residue is reprecipitated from a large amount of acetone. The precipitate is washed thoroughly with water and vacuum dried to afford Compound [5] (yield: 20%).

Then, Compound [5] is dissolved in pyridine and to the resulting mixture, acetic anhydride is added and the reaction is performed at 70° C. for one day. After the end of the reaction, pyridine and acetic anhydride are distilled off under reduced pressure and the residue is reprecipitated from a large amount of ice-cold water. The precipitate is washed thoroughly with ice-cold water and vacuum dried to afford Compound [6] (yield: 50%).

Compound [6] is dissolved in ethanol and subjected to hydrogenation (temperature: 50° C.; pressure: 4–5 kg/cm²) using 5% Pd/C. The reaction is discontinued when no decrease in the hydrogen pressure is observed more and, following filtration, ethanol is distilled off under reduced pressure. The residue is reprecipitated from a large amount of water/methanol to give Compound (B) (yield: 85%).

4. Synthesis of Compound (C) (R' is $CH_3-\underset{\underset{O}{\|}}{C}-$)

Separately synthesized benzyloxyacetic acid and an aqueous 25% NaOH are added to DMF and the mixture is stirred at room temperature for 1 h. Thereafter, a DMF solution of Compound [2] is added and the mixture is stirred for an additional 3 h. After the reaction, DMF is distilled off under reduced pressure and the residue is reprecipitated from a large amount of acetone. The precipitate is washed thoroughly with water and vacuum dried to afford Compound [7] (yield: 30%).

Thereafter, Compound [7] is dissolved in pyridine and to the resulting mixture, acetic anhydride is added and the reaction is performed at 70° C. for one day. After the reaction, pyridine and acetic anhydride are distilled off under reduced pressure and the residue is reprecipitated from a large amount of ice-cold water. The precipitate is washed thoroughly with ice-cold water and vacuum dried to give Compound [8] (yield: 70%).

Compound [8] is dissolved in ethanol and subjected to hydrogenation (room temperature; pressure: 4–5 kg/cm$^2$) using 5% Pd/C. The reaction is discontinued when no decrease in the hydrogen pressure is observed more and, following filtration, ethanol is distilled off under reduced pressure. The residue is reprecipitated from a large amount of water/methanol to afford Compound (C) (yield: 90%)

Identification can be done by NMR spectrum, mass spectrum and elementary analysis.

Figure 1B:
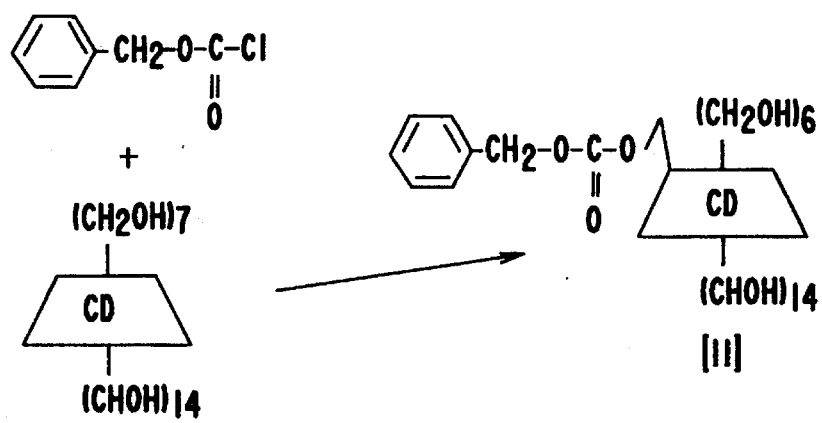
Figure 1B:
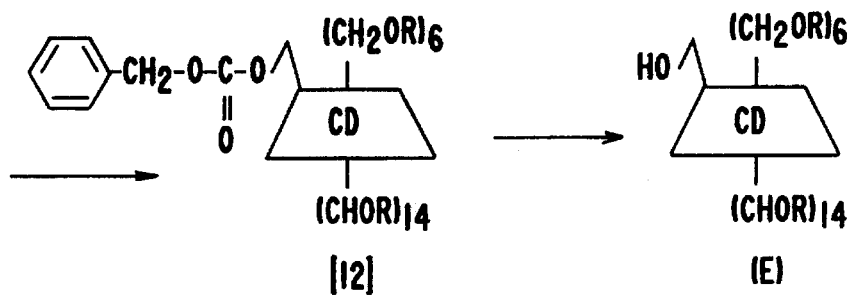
Figure 1C:
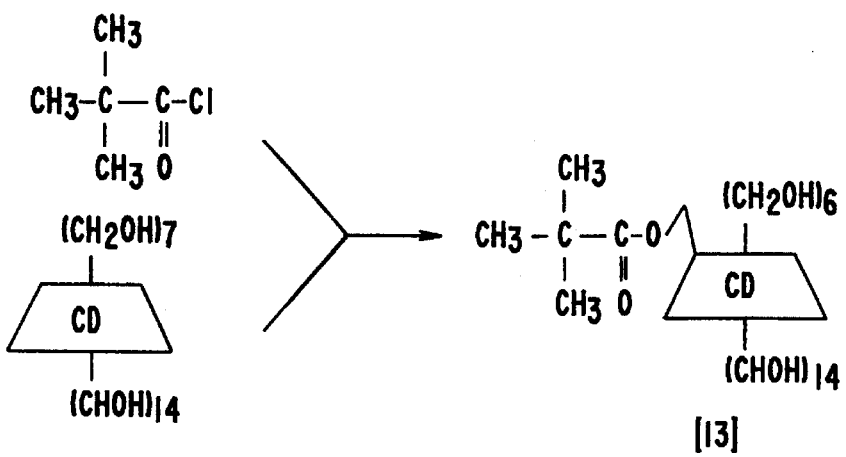
Figure 1C:
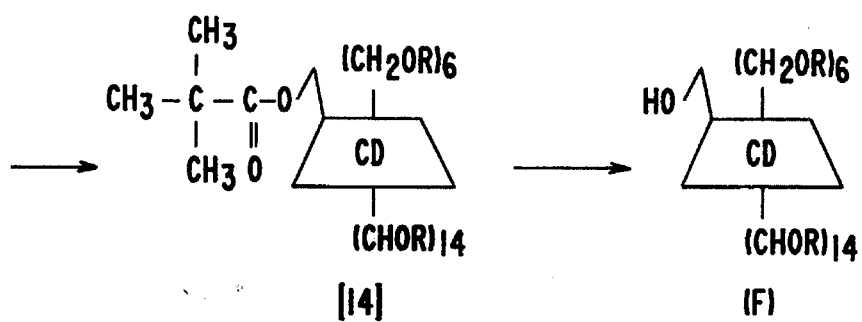
Figure 1D:
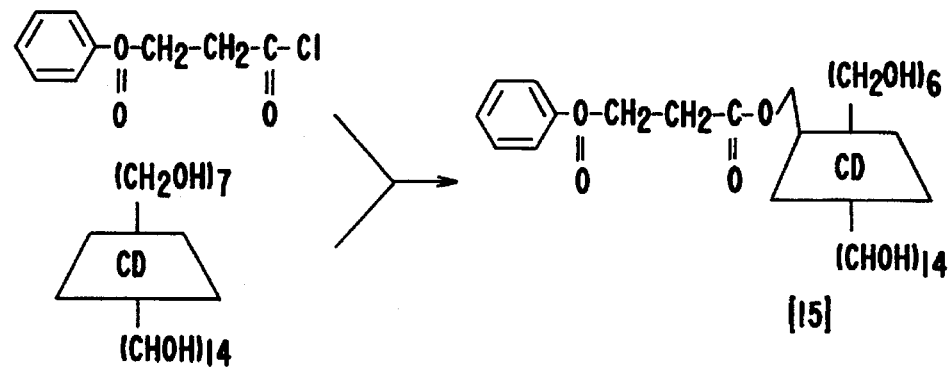
Figure 1D:
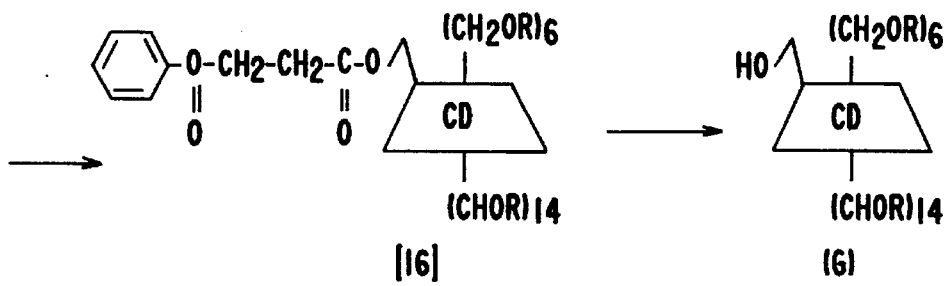
Figure 1E:
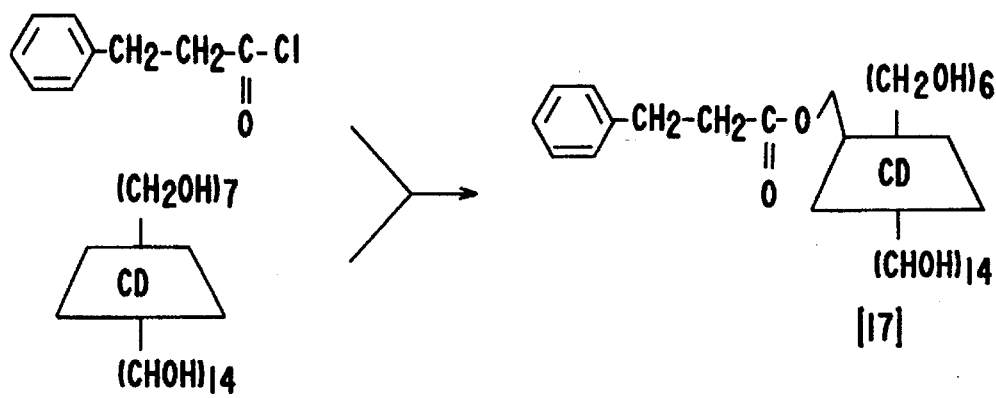
Figure 1E:
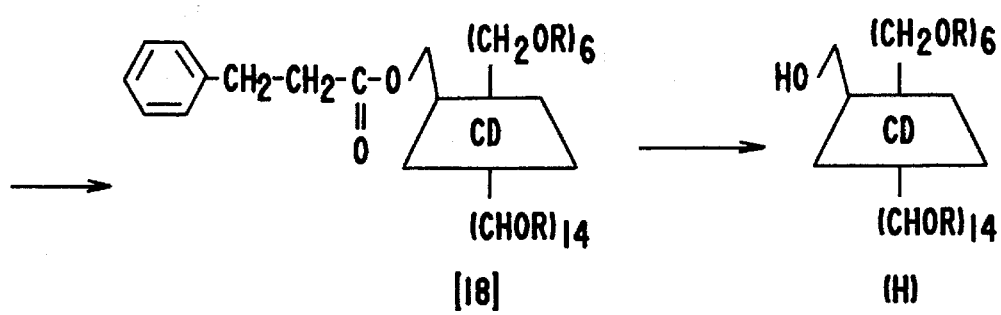
Figure 1F:
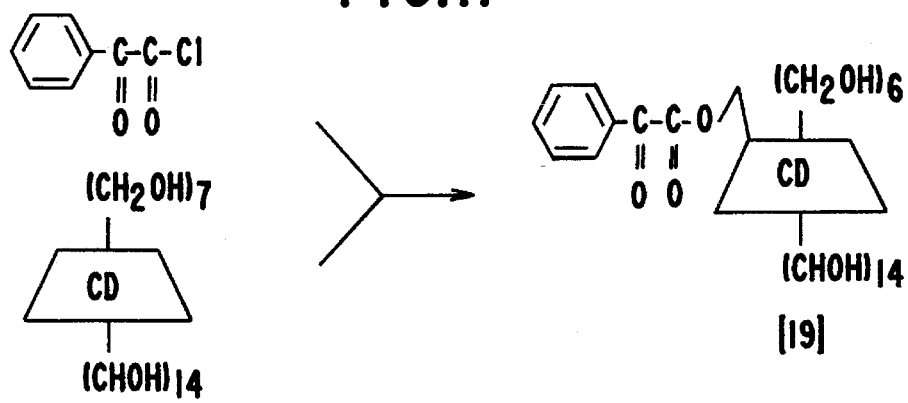
Figure 1F:
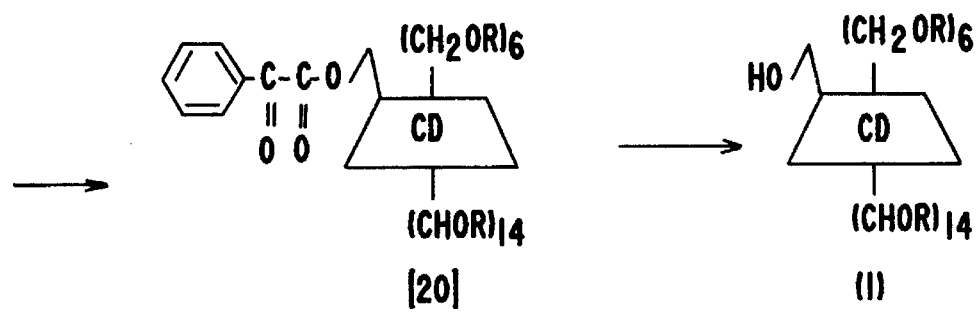
Figure 1G:
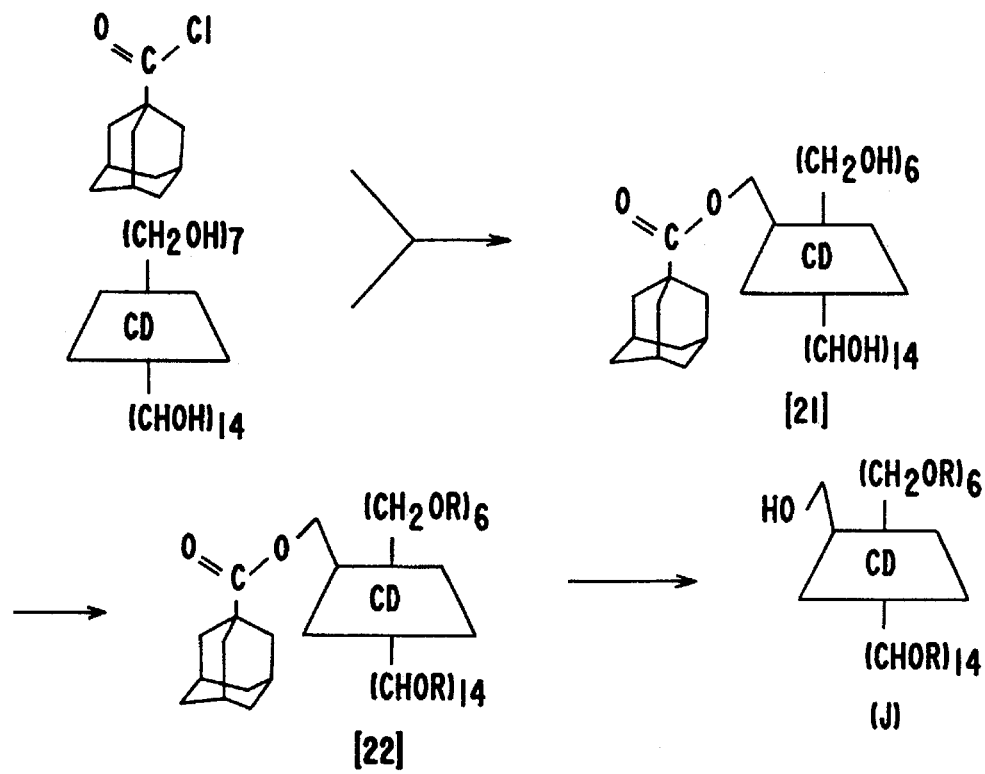
Figure 1H:
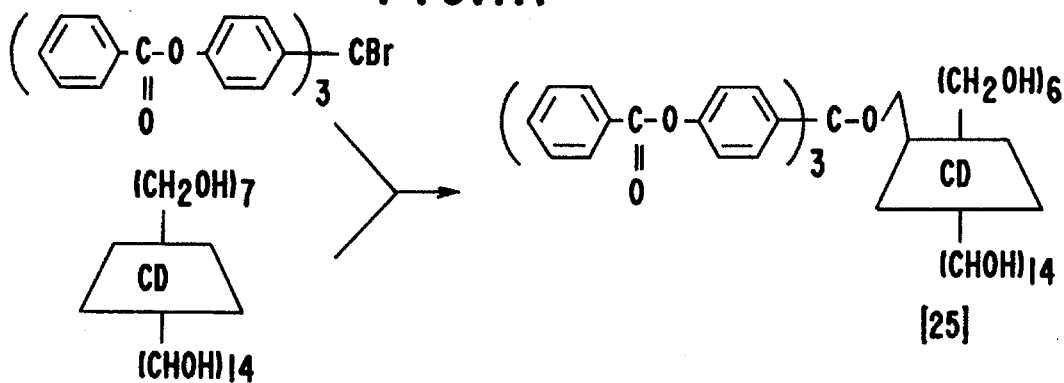
Figure 1H:
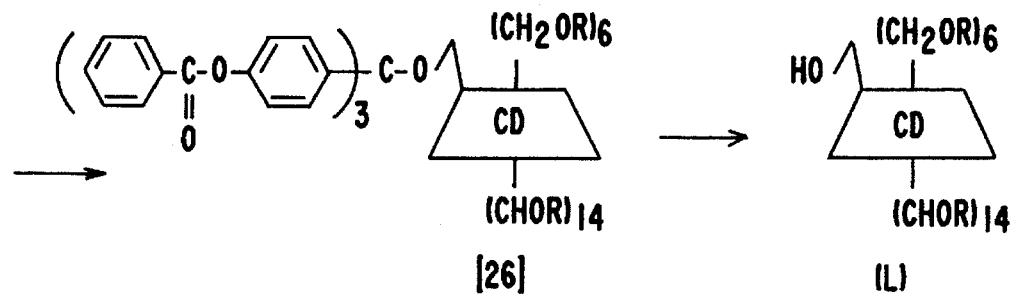
Figure 1I:
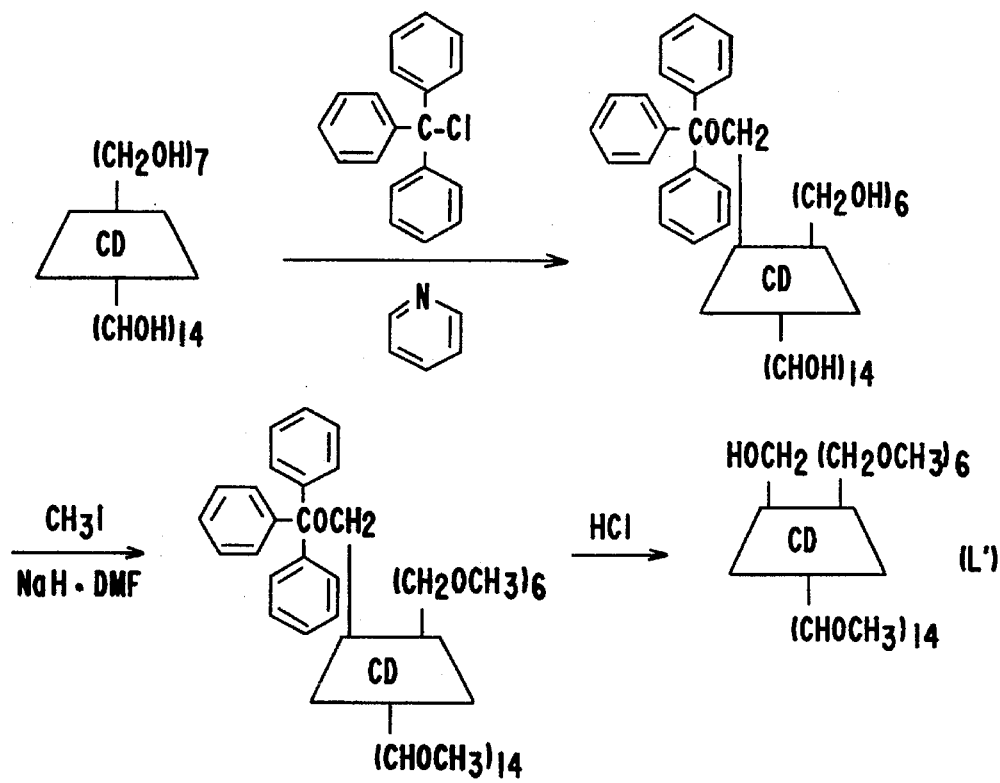
Figure 1J:
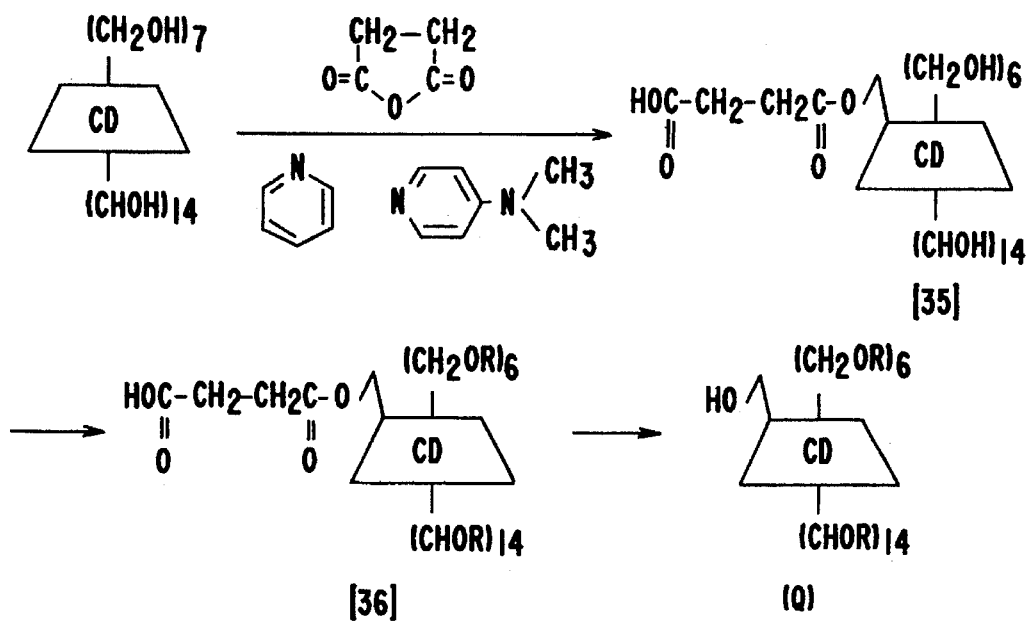
Figure 1K:
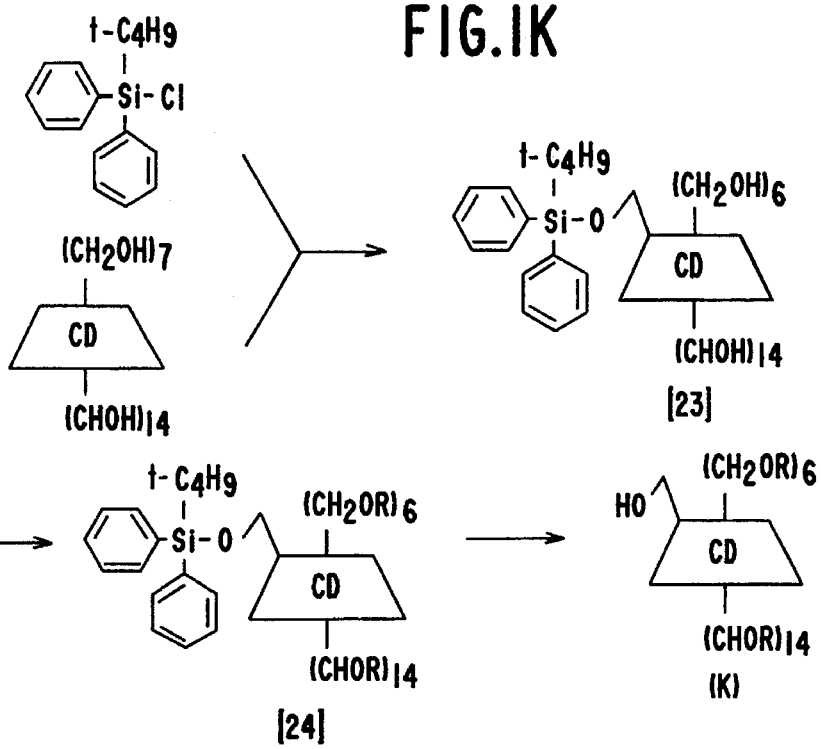
Figure 1L:
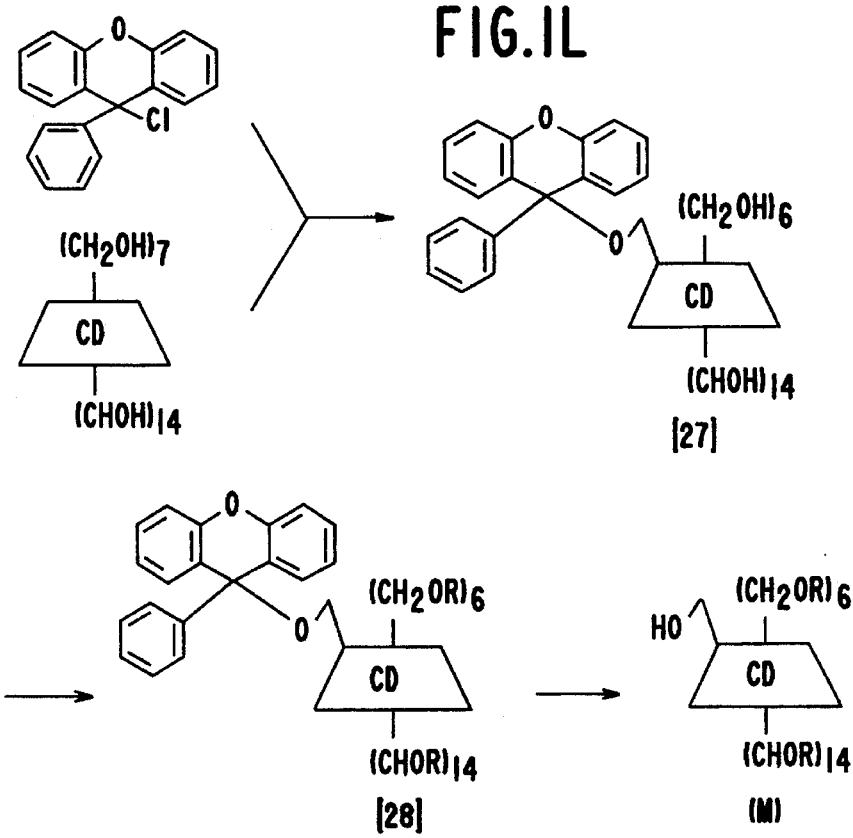
Figure 1M:
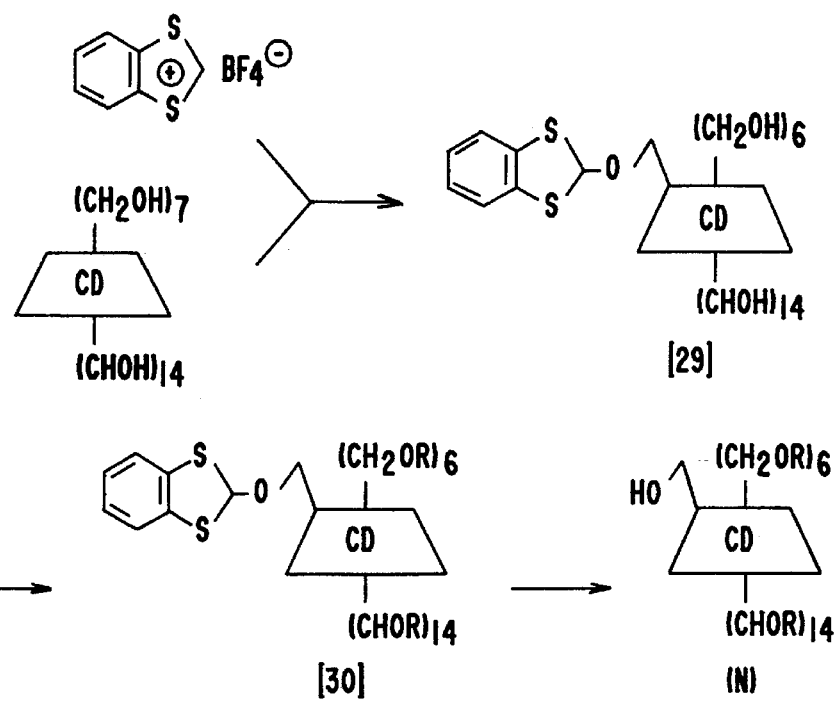
Figure 1N:
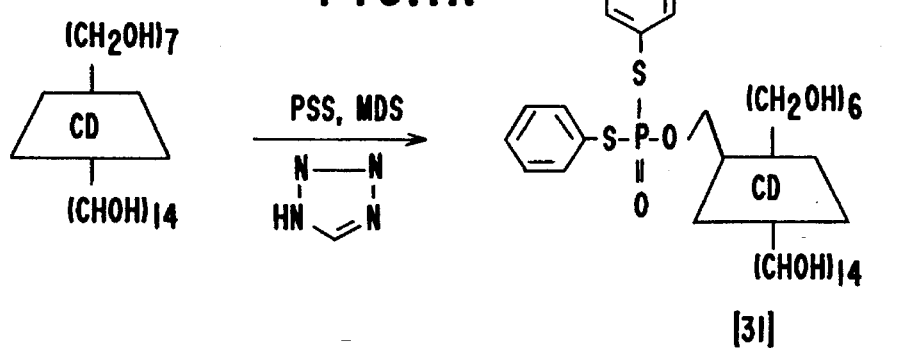
Figure 1N:
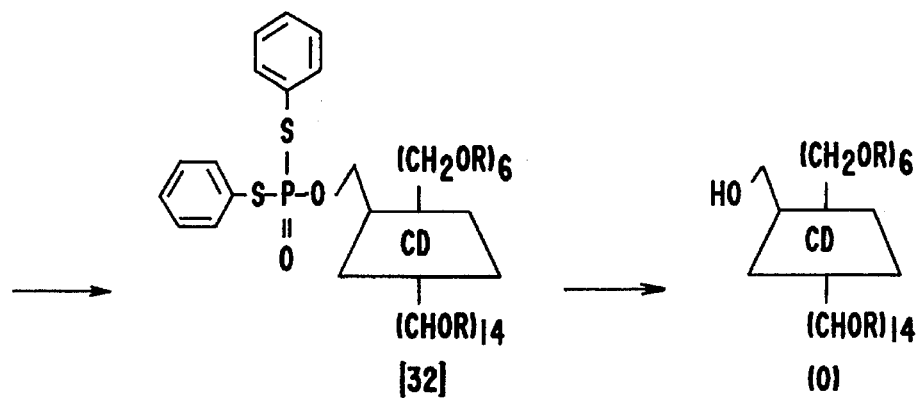
Figure 1O:
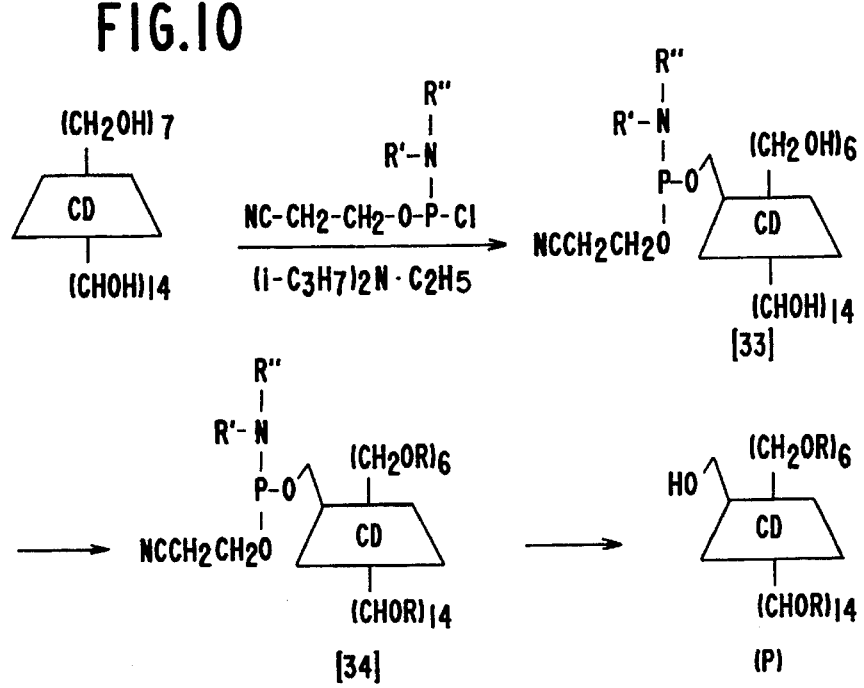
Figure 1P:
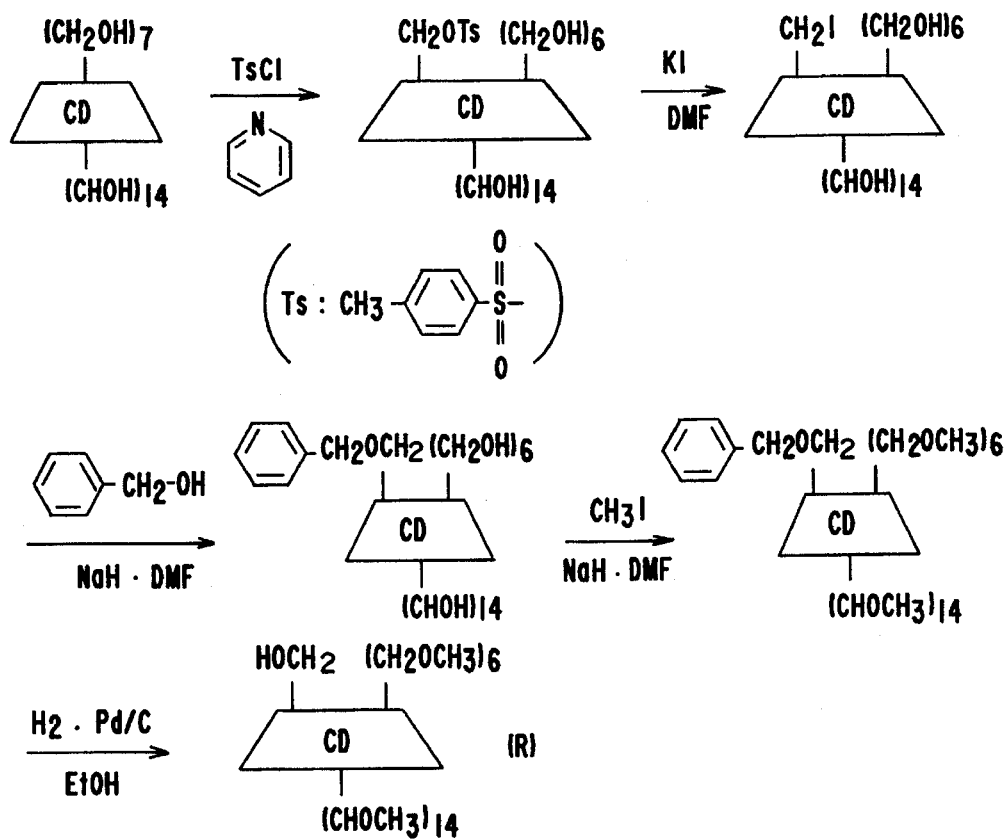
Figure 1Q:
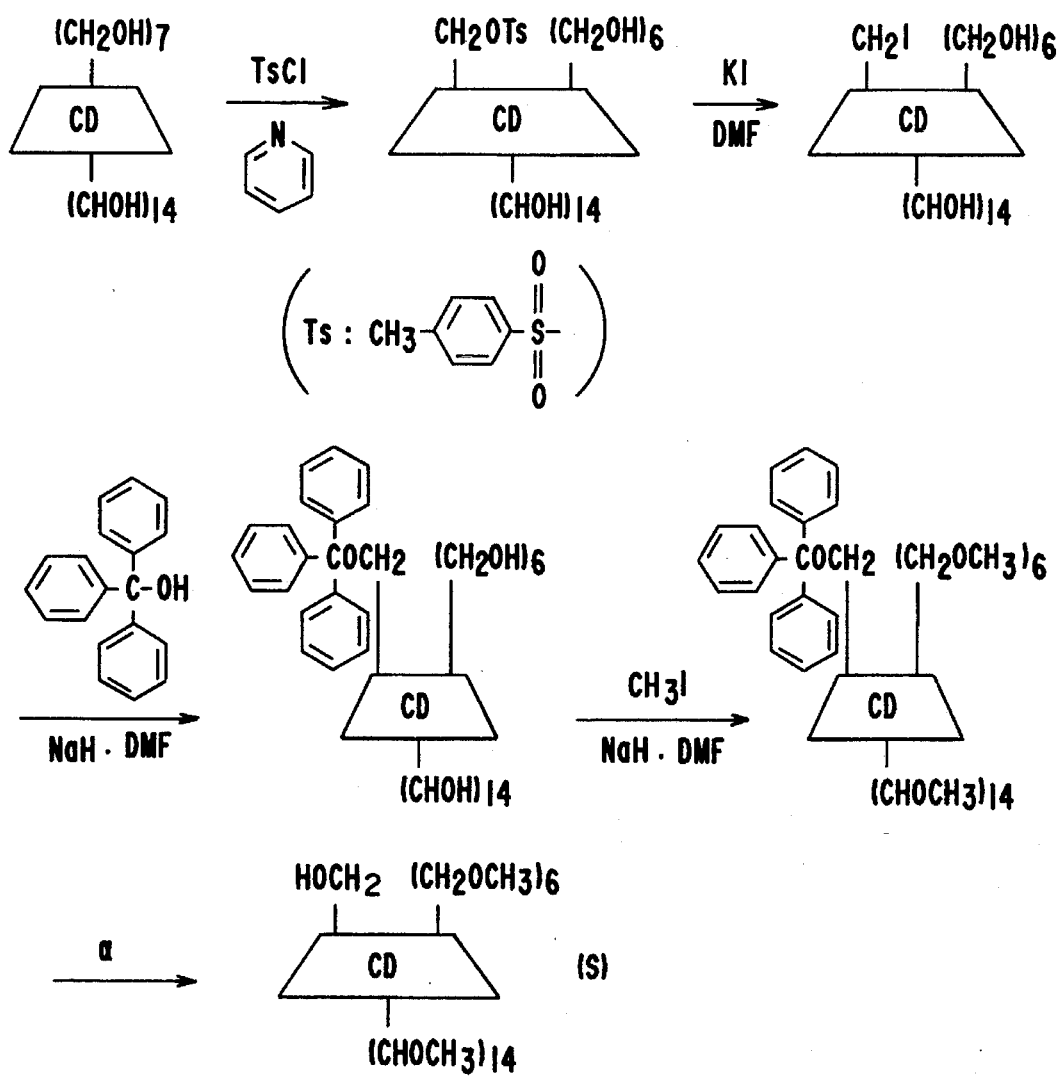

The reactions as shown in FIG. 1 above are performed concretely in the following manner.

In the specific examples of the reaction shown below, the residual hydroxyl groups in CD derivatives in (1)–(9) are protected with

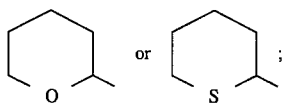

in (10)–(12), protected with

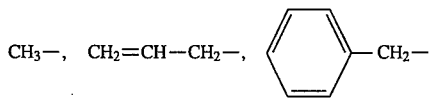

or

and in (13) and (14), protected with

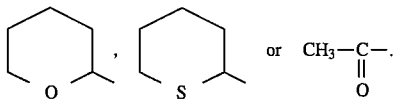

(Specific examples of protecting residual hydroxyl groups)
(A) Introduction of

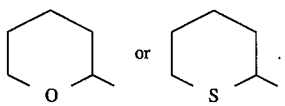

β-CD having one protected hydroxyl group is dissolved in anhydrous DMF and p-toluenesulfonic acid is added at room temperature. To the resulting mixture, 2,3-dihydro-4H-pyran or 2,3-dihydro-4H-thiine dissolved in DMF is added dropwise. After the dropwise addition, the mixture is allowed to react at room temperature for 24 h and, after the reaction, DMF is distilled off under reduced pressure. A small amount of ethanol is added to dissolve the residue and reprecipitation from a large amount of water is performed. The precipitate is washed thoroughly with water and dried. Purification by alumina column chromatography affords the desired compound with the residual hydroxyl group thus protected.

(B) Introduction of

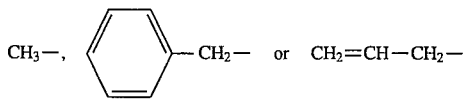

β-CD having one protected hydroxyl group is dissolved in anhydrous DMF and the mixture is cooled to 0°–5° C., and NaH is added thereto in a nitrogen atmosphere. After the addition, the mixture is stirred at 0°–5° C. for 2 h and subsequently, methyl iodide (with shielding from light) or benzyl bromide or allyl bromide (without shielding from light) is added dropwise. After the dropwise addition, the mixture is allowed to react at 0°–5° C. for 2 h, then at room temperature for 24 h. After the reaction, the mixture is filtered and DMF is distilled off under reduced pressure.

A small amount of ethanol is added to the residue, followed by reprecipitation from a large volume of water. The precipitate is washed thoroughly with water and dried. Thereafter, the dried product is purified by chromatography on a silica gel column to afford the desired compound with the residual hydroxyl groups protected.

(C) Introduction of

β-CD having one protected hydroxyl group is dissolved in anhydrous pyridine, and acetic anhydride is slowly added dropwise at room temperature. After the dropwise addition, the reaction is performed at 60° C. for 12 h. After the reaction, pyridine is concentrated under reduced pressure and the residue is reprecipitated from a large amount of ice-cold water. The precipitate is washed thoroughly with water and dried. Thereafter, the dried product is purified by chromatography on a silica gel column to give the desired compound with the residual hydroxyl groups protected.

(1) β-CD (n=7) is dissolved in anhydrous pyridine and the resulting mixture is held at 0°–5° C. To the mixture, allyloxycarbonyl chloride dissolved in pyridine is slowly added dropwise. During and after the dropwise addition, the temperature of the mixture is maintained at 0°–5° C., then stirred for 12 h at that temperature. After the reaction, pyridine is distilled off at a temperature not exceeding 20° C. under reduced pressure, and the residue is reprecipitated from a large amount of acetone. The precipitate thus obtained is collected, washed thoroughly with acetone and dissolved in hot ethanol. The insolubles are filtered off while hot and the filtrate is allowed to cool to afford mono-6-allyloxycarbonyl β-CD [9] as crystals (yield: 30%).

The mono-6-allyloxycarbonyl β-CD [9] thus obtained is dissolved in anhydrous DMF and p-toluenesulfonic acid is added at room temperature. To the resulting mixture, 2,3-dihydro-4H-pyran or 2,3-dihydro-4H-thiine dissolved in DMF is added dropwise. After the dropwise addition, the reaction is performed at room temperature for 24 h and, after the reaction, DMF is distilled off under reduced pressure. The residue is dissolved in a small amount of ethanol and reprecipitated from a large amount of water. The precipitate is washed thoroughly with water and dried. Purification by alumina column chromatography affords the desired Compound [10].

The tetrahydropyranylated product (or tetrahydrothiopyranylated product) of mono β-CD derivative [10] thus obtained is dissolved in absolute methanol and 4–5M methanol alcoholate (in methanol) is added dropwise at room temperature. After the dropwise addition, the reaction is performed at room temperature for 24 h and, after the reaction, the precipitate is filtered. A cation-exchange resin is added to the filtrate and the mixture is stirred at room temperature for 2 h, followed by filtration to remove the resin. The filtrate is concentrated under reduced pressure, and water is added to the residue, followed by extraction with chloroform. The chloroform layer is concentrated under reduced pressure and the residue is removed and purified by chromatography on an alumina column to give the desired compound, mono-hydroxy β-CD derivative (D).

(2) Mono-6-benzyloxycarbonyl β-CD [11] is obtained as in Reaction Example (1) except that allyloxycarbonyl chloride is replaced by benzyloxycarbonyl chloride (yield: 45%).

Subsequently, the same procedure as in Reaction Example (1) for the synthesis of Compounds [10] and (D) is repeated whereby Compounds [12] and (E) are obtained.

(3) β-CD is dissolved in anhydrous pyridine and pivaloyl chloride dissolved in pyridine is slowly added dropwise at 0°–5° C. After the dropwise addition, the mixture is loft to room temperature and stirred for 12 h. After the reaction, pyridine, unreacted pivaloyl chloride, etc. are distilled off under reduced pressure and the residue is reprecipitated from a large amount of acetone. The resulting precipitate is collected, washed thoroughly with acetone, and dissolved in hot methanol. The insolubles are filtered off while hot and the filtrate is left standing to cool to give mono-6-trimethylacetyl β-CD [13] as crystals (yield: 45%).

Subsequent is conducted as in Reaction Example (1) for the synthesis of Compounds [10] and (D) to afford Compounds [14] and (F).

(4) Mono-6-benzoylpropionyl β-CD [15] is obtained in analogous way as in Reaction Example (3) except that pivaloyl chloride is replaced by 3-benzoylpropionyl chloride (yield: 40%).

Subsequent procedure is performed as in Reaction Example (1) for the synthesis of Compounds [10] and (D) to afford Compounds [16] and (G).

(5) Mono-6-phenylpropionl β-CD [17] is obtained in analogous way as in Reaction Example (3) except that pivaloyl chloride is replaced by 3-phenylpropionyl chloride (yield: 35%).

The procedure of Reaction Example (1) for the synthesis of Compounds [10] and (D) is repeated to afford Compounds [18] and (H).

(6) Mono-6-benzoylformyl β-CD [19] is obtained in analogous way as in Reaction Example (3) except that the pivaloyl chloride is replaced by benzoylformyl chloride (yield: 15%).

The procedure of Reaction Example (1) for the synthesis of Compounds [10] and (D) is repeated to give Compounds [20] and (I).

(7) Mono-6-adamantancarbonyl β-CD [21] is obtained as in Reaction Example (3) except that pivaloyl chloride is replaced by 1-admantancarboxylic acid chloride (yield: 25%).

The procedure of Reaction Example (1) for the synthesis of Compounds [10] and (D) is repeated to afford Compounds [22] and (J).

(8)-1 β-CD is dissolved in anhydrous pyridine and the solution is cooled to 0°–5° C. To the resulting mixture, 4,4', 4"-tris(4-benzoyloxy)trityl bromide dissolved in pyridine is slowly added dropwise. After the dropwise addition, the mixture is stirred at 0°–5° C. for 1 h, then at room temperature for 8 h. Thereafter, pyridine is distilled off under reduced pressure at a temperature not exceeding 40° C., and the residue is reprecipitated from a large amount of ethyl ether. The precipitate is washed with hot water and the remainder is purified by recrystallization from ethanol to afford Compound [25] (yield: 254%).

The compound [25] thus obtained is treated as in the synthesis of Compound [10] in Reaction Example (1), whereby Compound [26] is obtained.

The tetrahydropyranylated product (or tetrahydrothiopyranylated product) of mono β-CD derivative [26] thus obtained is dissolved in ethanol and an aqueous 0.1–0.2M NaOH is added, followed by stirring at room temperature for 2 h. After the reaction, ethanol is distilled off under reduced pressure and the residue is extracted with chloroform-water. The chloroform layer is concentrated under reduced pressure and the residue is separated and purified by chromatography on an alumina column to yield monohydroxy-CD derivative (L).

(8)-2 β-CD is dissolved in pyridine at room temperature and to the resulting mixture, trityl chloride dissolved in pyridine is added dropwise. After the dropwise addition, the mixture is stirred at 40° C. for 3 h. After the reaction, pyridine is distilled off under reduced pressure at a temperature not exceeding 40° C., and the residue is reprecipitated from a large amount of acetone. The precipitate is collected, dissolved in a small amount of pyridine and reprecipitated from a large amount of water. The precipitate is collected, dried and purified by recrystallization from water/methanol to afford mono-6-trityl-β-CD (yield: 65%).

The precipitate is collected, and vacuum-dried and dissolved in DMF. NaH is added under nitrogen stream, followed by reaction at room temperature for 3 h. Thereafter, methyl iodide is added at 0° C. for methylation of hydroxyl groups. Methylation is performed in the dark for 24 h. After the reaction is complete, the mixture is filtered, the filtrate is distilled off under reduced pressure, and the residue is extracted with a water/chloroform mixture. The chloroform layer is concentrated under reduced pressure and the etude product is dissolved in ethanol, followed by reprecipitation from a large amount of water. The resulting precipitate is removed by filtration and purified by silica gel column chromatography to afford mono-6-o-trimethyl-per-0-methyl β-CD (yield: 75%).

The compound thus obtained is dissolved in chloroform and, shaken with a small amount of hydrochloric acid. Then, the chloroform layer is neutralized, washed with water, dried, and the solvent is removed under reduced pressure to give monohydroxy-methyl β-CD (mono-6-hydroxy-per-0-methyl β-CD) (L') (yield: 95%).

(9) β-CD is dissolved in pyridine and succinic anhydride is added to the resulting mixture. After dissolution, a catalytic amount of 4-dimethylaminopyridine is added and the reaction is performed with stirring at room temperature for 24 h. After the reaction, pyridine is distilled off under reduced pressure and a small amount of water is added to the residue, followed by reprecipitation from a large amount of acetone. The precipitate is washed well with acetone and recrystallized from methanol to afford the desired product [35] (yield: 20%).

The procedure for the synthesis of Compounds [10] and (D) in Reaction Example (1) is repeated whereby Compounds [36] and (Q) are obtained.

(10) β-CD is dissolved in anhydrous DMF at room temperature. Then, imidazole is added and then, a DMF solution of t-butyl diphenylsilyl chloride is slowly added dropwise. After the dropwise addition, the mixture is stirred at room temperature for 24 h. After the reaction, DMF is distilled off under reduced pressure at a temperature not exceeding 40° C., and the residue is reprecipitated from acetone. The precipitate is purified by recrystallization from isopropyl alcohol to afford mono-6-t-butyldiphenylsilyl β-CD [23] (yield: 30%).

Other silylating agents such as trimethylsilyl chloride, triethylsilyl chloride and t-butyldimethylsilyl chloride may react even with a secondary hydroxyl group in addition to a primary hydroxyl group. However, with the silylating agents as mentioned above, presumably due to the participation of steric hindrance, functional group is introduced to only one primary hydroxyl group under the aforementioned reaction conditions.

Protection of residual hydroxyl groups (A) Mono-6-t-butyldiphenyl β-CD [23] is dissolved in anhydrous DMF, the mixture is cooled to 0°–5° C., and NaH is added in a nitrogen atmosphere. After the addition, the mixture is stirred for 2 h at 0°–5° C. and subsequently, methyl iodide (with shielding from light) or benzyl bromide or allyl bromide (without shielding from light) is added dropwise. After the dropwise addition, the reaction is performed at 0°–5° C. for 2 h, then at room temperature for 24 h. After the reaction, the mixture is filtered and DMF is distilled off under reduced pressure. A small amount of ethanol is added to the residue which is then subjected to reprecipitation from a large amount of water. The precipitate is washed thoroughly with water, then dried. Purification by silica gel column chromatography affords the desired product [24].

(B) The mono-6-t-butyldiphenyl β-CD [23] is dissolved in anhydrous pyridine, and acetic anhydride is slowly added dropwise at room temperature. After the dropwise addition, the reaction is performed at 60° C. for 12 h. After the reaction, pyridine is concentrated under reduced pressure and the residue is reprecipitated from a large amount of ice-cold water. The precipitate is washed thoroughly with water, dried, and purified by chromatography on a silica gel column to give the desired Compound [24].

The mono-t-butyldiphenylsilyl β-CD derivative [24] (e.g. methylated compound) thus obtained is dissolved in anhydrous THF and cooled to 0°–5° C. To the mixture, a THF solution of n-tetrabutylammonium fluoride is added dropwise and, after the dropwise addition, the reaction is performed under reflux for 6 h. Then the mixture is left standing to cool and THF is distilled off under reduced pressure, followed by extraction with a chloroform/water system. The chloroform layer is dried and concentrated under reduced pressure, the residue is separated and purified by chromatography on a silica gel column, whereby the desired Compound (K) is obtained.

(11) β-CD is dissolved in anhydrous pyridine, and 9-chloro9-phenylxanthene (=pixyl chloride) dissolved in pyridine is slowly added dropwise at room temperature. After the dropwise addition, the mixture is stirred at room temperature for 24 h. Thereafter, pyridine is distilled off under reduced pressure at a temperature not exceeding 40° C. and the residue is reprecipitated from a large amount of acetone. The precipitate is washed with hot water and the remainder is purified by recrystallization from methanol to afford Compound [27] (yield: 40%).

From the mono-6-pixyl β-CD [27], Compound [28] is obtained as in the synthesis (A) or (B) of Compound [24] in Reaction Example (10).

Mono-pixyl β-CD derivative [28] (e.g. acetylated compound) is dissolved in anhydrous methylene chloride and a methylene chloride solution of trifluoroacetic acid is slowly added dropwise at 0°–5° C. After the dropwise addition, the mixture is allowed to react at room temperature for 1 h. After the reaction, methylene chloride is distilled off under reduced pressure and the residue is extracted with a chloroform/water system. The chloroform layer is dried, concentrated under reduced pressure, and the residue is removed and purified by silica gel column chromatography, to give the desired product (M). (12) β-CD is dissolved in anhydrous pyridine, and 1,3-benzodithiolium tetrafluoroborate (BDTF) dissolved in pyridine is slowly added dropwise at room temperature. After the dropwise addition, the mixture is stirred at room temperature for 24 h. Thereafter, pyridine is distilled off under reduced pressure at a temperature not exceeding 40° C. and the residue is reprecipitated from a large amount of acetone. The precipitate is washed thoroughly with water and the remainder is purified by recrystallization from ethanol to afford Compound [29] (yield: 40%).

The Compound [29] thus obtained is treated as in the synthesis (A) or (B) of Compound [24] in Reaction Example (10), whereby Compound [30] is obtained.

Mono-1,3-benzodithiol-2-yl β-CD derivative [30] (e.g. benzylated product) is dissolved in 80% acetic acid and the mixture is stirred at room temperature for 3 h. After the reaction, acetic acid is distilled off under reduced pressure and the residue is extracted with a chloroform/water system. The chloroform layer is dried, concentrated under reduced pressure, and the residue is removed and purified by chromatography on a silica gel column, to give the desired Compound (N). (13) 2-CD and tetrazole are dissolved in pyridine. Then, cyclohexylammonium S,S-diphenylphosphorodithioate (PSS) and mesitylenedisulfonyl chloride (MDS) are added and the mixture is allowed to react at room temperature for 6 h. Thereafter, pyridine is distilled off under reduced pressure at a temperature not exceeding 40° C., and water is added to the residue. The resultant mixture is allowed to reprecipitate from a large amount of acetone. The precipitate is washed thoroughly with acetone and recrystallized from methanol to afford the product [31] (yield: 15%).

The β-CD monoderivative [31] thus obtained is dissolved in anhydrous DMF and p-toluenesulfonic acid is added at room temperature. To the resulting mixture, 2,3-dihydro-4H pyran or 2,3-dihydro-4H-thiine, dissolved in DMF, is added dropwise. After the dropwise addition, the mixture thus obtained is allowed to react at room temperature for 24 h. Then, DMF is distilled off under reduced pressure, the residue is dissolved in a small amount of ethanol and reprecipitated from a large amount of water. The precipitate is washed thoroughly with water, dried and purified by chromatography on an alumina column to afford the desired product [32].

In the case where the protection of the residual hydroxyl groups is performed by acetylation, the β-CD monoderivative [31] may also be protected in analogous way as in the protection of Compound [23] in Reaction Example (10).

The mono β-CD derivative (e.g. acetylated product [32] is dissolved in dioxane, and gaseous ammonia is passed through the solution at room temperature to allow reaction. After the reaction begins, the temperature of the mixture is raised to 50° C. and the reaction is performed for 6 h. After the reaction, the mixture is left standing to cool, dioxane is distilled off under reduced pressure, and the residue is extracted with a chloroform/water system. The chloroform layer is washed with dilute hydrochloric acid and water, dried and concentrated under reduced pressure. The residue is removed and purified by chromatography on a silica gel column to give the desired product (O). (14) β-CD is dissolved in DMF, and diisopropylethylamine is added to the mixture which is then cooled to 0°–5° C. An agent for converting to phosphite (R', R"=isopropyl) is slowly added and the mixture is stirred at room temperature for 3 h. After the reaction, DMF is distilled off under reduced pressure and water is added to the residue, followed by thorough agitation. The insolubles are filtered and the filter cake is washed thoroughly with water, followed by recrystallization from ethanol to give the product [33] (yield: 20%).

The β-CD monoderivative [33] is treated as in the synthesis of Compound [32] in Reaction Example (13), whereby Compound [34] is obtained.

The resulting compound [34] is treated as in the synthesis of Compound (0) in Reaction Example (13), whereby to obtain compound (P).

(15) β-CD is dissolved in pyridine at room temperature, and paratoluenesulfonyl chloride dissolved in pyridine is added dropwise at 20° C. After the dropwise addition, the resultant mixture is stirred at room temperature for 24 h and, after the reaction, pyridine is distilled off under reduced pressure at a temperature not exceeding 40° C. and the residue is reprecipitated from a large amount of acetone. The precipitate is collected and purified by repeated recrystallization from water (yield: 25%). The β-CD monotosylate thus obtained is reacted with KI in DMF at 70°–80° C. for one day and, after the reaction, DMF is distilled off under reduced pressure and the residue is reprecipitated from a large amount of acetone. The precipitate is purified by recrystallization from n-butanol/ethanol/water (yield: 60%).

Subsequently, benzyl alcohol

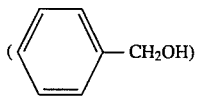

and NaH are reacted in DMF in a nitrogen atmosphere and, to the resultant mixture, a DMF solution of β-CD monoiodide is added at room temperature, followed by reaction at 70°–80° C. for 24 h. After the reaction, DMF is distilled off under reduced pressure and the residue is reprecipitated from a large amount of acetone. The precipitate is collected and vacuum-dried, then dissolved in DMF. NaH is added and the reaction is performed at room temperature for 3 h and, thereafter, hydroxyl groups are methylated by the addition of methyl iodide at 0° C. Said methylation is performed in the dark for a period of 24 h. After the reaction, the mixture is filtered, the filtrate is distilled off under reduced pressure, and the residue is extracted with a water/chloroform system. The chloroform layer is concentrated under reduced pressure, and the crude product is dissolved in ethanol, followed by reprecipitation from a large amount of water. The resulting precipitate is filtered and the filter cake is purified by chromatography on a silica gel column to give monobenzyl-methyl β-CD (mono-6-benzyl-per-0-methyl β-CD) (yield: 75%).

The compound thus obtained is dissolved in ethanol and subjected to hydrogenation using Pd/C as a catalyst. Upon concentration of the solvent under reduced pressure, monohydroxy-methyl β-CD (mono-6-hydroxy-per-0-methyl β-CD) (R) is obtained (yield: 95%).

Alternatively, monobenzyl β-CD (crude product) may be dissolved in pyridine and reacted either with acetic anhydride or with benzoyl chloride to give monobenzyl-acetyl β-CD or monobenzyl-benzoyl β-CD, respectively (esterification).

Subsequent hydrogenation in a similar manner affords a monohydroxy derivative.

(16) β-CD is dissolved in pyridine at room temperature and to the mixture, paratoluenesulfonyl chloride dissolved in pyridine is added dropwise at 20° C. After the dropwise addition, the mixture is stirred at room temperature for 24 h and, after the reaction, pyridine is distilled off under reduced pressure at a temperature not exceeding 40° C., and the residue is added to a large amount of acetone for reprecipitation. The precipitate is collected and purified by repeated recrystallization from water (yield: 25%). The β-CD monotosylate thus obtained is reacted with KI in DMF at 70°–80° C. for one day and, after the reaction, DMF is distilled off under reduced pressure, and the residue is reprecipitated from a large amount of acetone. The precipitate is purified by recrystallization from n-butanol/ethanol/water (yield: 60%).

Subsequently,

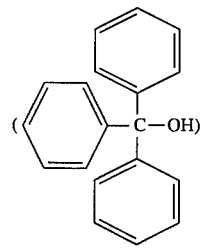

and NaH are reacted in DMF in nitrogen atmosphere and, to the resulting mixture, a DMF solution of β-CD monoiodide is added and reacted at 70°–80° C. for 24 h. After the reaction, DMF is distilled off under reduced pressure and the residue is reprecipitated from a large amount of acetone. The precipitate is collected and vacuum dried, then dissolved in DMF and reacted with NaH under nitrogen stream at room temperature for 3 h, followed by reaction with methyl iodide at 0° C. for methylation of the hydroxyl groups. Methylation is performed in the dark for a period of 24 h. After the reaction, the mixture is filtered and the filtrate is distilled off under reduced pressure followed by extraction with a water/chloroform system. The chloroform layer is concentrated under reduced pressure and the crude product is dissolved in ethanol, followed by reprecipitation from a large amount of water. The resulting precipitate is filtered and the filter cake is purified by column chromatography to give β-CD (mono-6-trityl-per-0-methyl β-CD) (yield: 75%).

The compound thus obtained is dissolved in chloroform and shaken with a small amount of HCl. Then the chloroform layer is neutralized, washed with water, dried, and the solvent is concentrated under reduced pressure to give monohydroxy-methyl-β-CD (mono-6-hydroxy-per-0-methyl β-CD) (S) (yield: 95%).

(17) Introduction and removal of:

(a) $CH_2=CHCH_2OH$ (The compound of the formula [10])

(b) $CH_2=CHCH_2O(CH_2)_mOH$ (The compound of the formula [9])

In a nitrogen atmosphere, (a) or (b) as shown above is reacted with NaH in DMF at room temperature and, to the mixture, a DMF solution of β-CD monoiodide is added and, reacted at 70°–80° C. for 24 h. After the reaction, DMF is distilled off under reduced pressure and the residue is reprecipitated from a large amount of acetone. The precipitate is collected and vacuum dried.

Yield:

(a)→35%

(b)→55% (m=2)

Methylation is performed in the same manner as in Synthesis Example (15).
Yield:
(a)→60%
(b)→70% (m2)

Then, monoallyl-methyl β-CD (A derivative of (a), mono-6-allyl-per-0-methyl β-CD) is dissolved in DMSO and isomerized with t-BuOK while stirring at 50° C. for 1 h, then at room temperature for 24h. Thereafter, an aqueous HgCl₂ solution is added to the resulting mixture in the presence of HgO followed by stirring at room temperature for 6 h. After the reaction, the mixture is filtered and the filtrate is concentrated under reduced pressure. Chloroform is added to the residue which is filtered again, and chloroform is distilled off under reduced pressure. The residue is separated by chromatography on a silica gel column to afford monohydroxyethyl-methyl β-CD (mono-6-hydroxyethyl-per-0-methyl β-CD) (yield: (a)→25%, (b)→35%).

(18) Introduction and removal of:

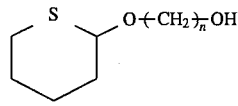 (c)

In a nitrogen atmosphere, the compound (c) as shown above (m=2) is reacted with NaH in DMF at room temperature and, to the mixture, a DMF solution of β-CD monoiodide is added followed by reaction at 30°-40° C. for 60 h. After the reaction. DMF is distilled off under reduced pressure and the residue is reprecipitated from a large amount of acetone. The precipitate is collected and vacuum dried (yield: 40%).

Methylation is performed in the same way as in Synthesis Example (15) (yield: 55%).

Then, mono-tetrahydro-2-thiopyranyloxyethyl-methyl β-CD) (A derivative of (c), mono-6-tetrahydro-2-thiopyranyloxyethyl-per-0-methyl β-CD) is dissolved in acetonitrile and an aqueous AgNO₃ solution is added at room temperature. After the addition, the mixture is stirred at room temperature for 6 h. Thereafter, the mixture is filtered and the filtrate is concentrated under reduced pressure. The residue is separated by chromatography on silica gel to give mono-hydroxyethyl-methyl β-CD (yield: 45%).

(19) Introduction and removal of:
(d) $(CH_3)_3-Si-O(CH_2)_mOH$
   (The compound of the formula [9])
(e) $(t-Bu)(CH_3)_2-Si-O(CH_2)_mOH$
   (The compound of the formula [9])

In a nitrogen atmosphere, Compound (d) (m=2) or (e) is reacted with NaH in DMF at room temperature and, to the mixture, a DMF solution of β-CD monoiodide is added and reacted. After the reaction, DMF is distilled off under reduced pressure and the residue is reprecipitated from a large amount of methanol. The precipitate is collected and vacuum dried (yield: (d)→40%; (e)→30%).

Methylation is performed in the same manner as in Synthesis Example (15) (yield: (d)→50%; (e)→55%).

Then, monotrimethylsilyloxymethyl-methyl β-CD (A derivative of (d), mono-6-trimethylsilyloxyethyl-per-0methyl β-CD) is dissolved in THF and tetrabutylammonium fluoride ((n-C₄H₉)₄N⁺F⁻) dissolved in THF is added dropwise at room temperature. After the dropwise addition, the mixture is allowed to react under reflux for 6 h and thereafter. THF is distilled off under reduced pressure. The residue is separated by chromatography on a silica gel column to give monohydroxyethyl-methyl β-CD (yield: (d)→25%; (e)→30%).

Identification can be done by NMR spectrum, mass spectrum and elementary analysis.

Other CD derivatives can also be prepared in accordance with the method described above.

Shown below are the schemes of the reaction for synthesizing polymers containing immobilized CD, using the above-described compounds.

Figure 2A:
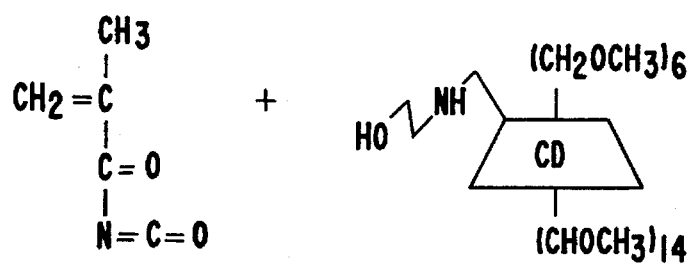
FIG. 2 is a flow chart showing the reactions for synthesizing polymers containing immobilized cyclodextrin in accordance with the present invention.
Figure 2A:
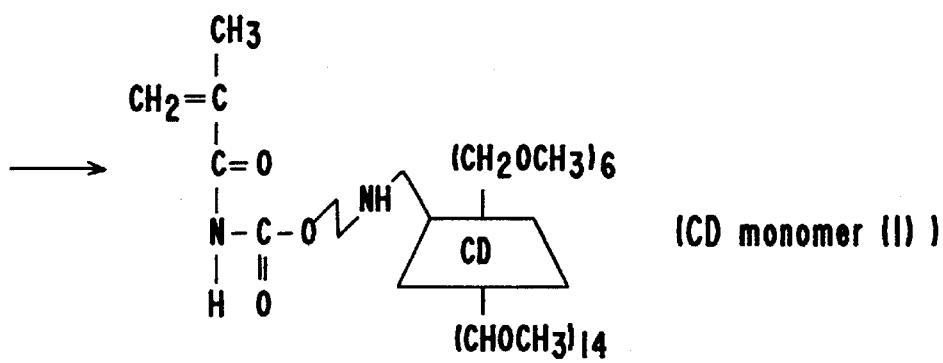
Figure 2A:
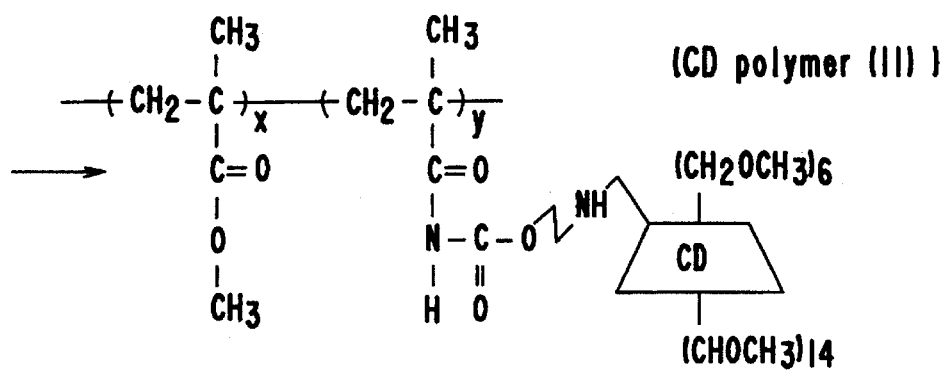
Figure 2B:
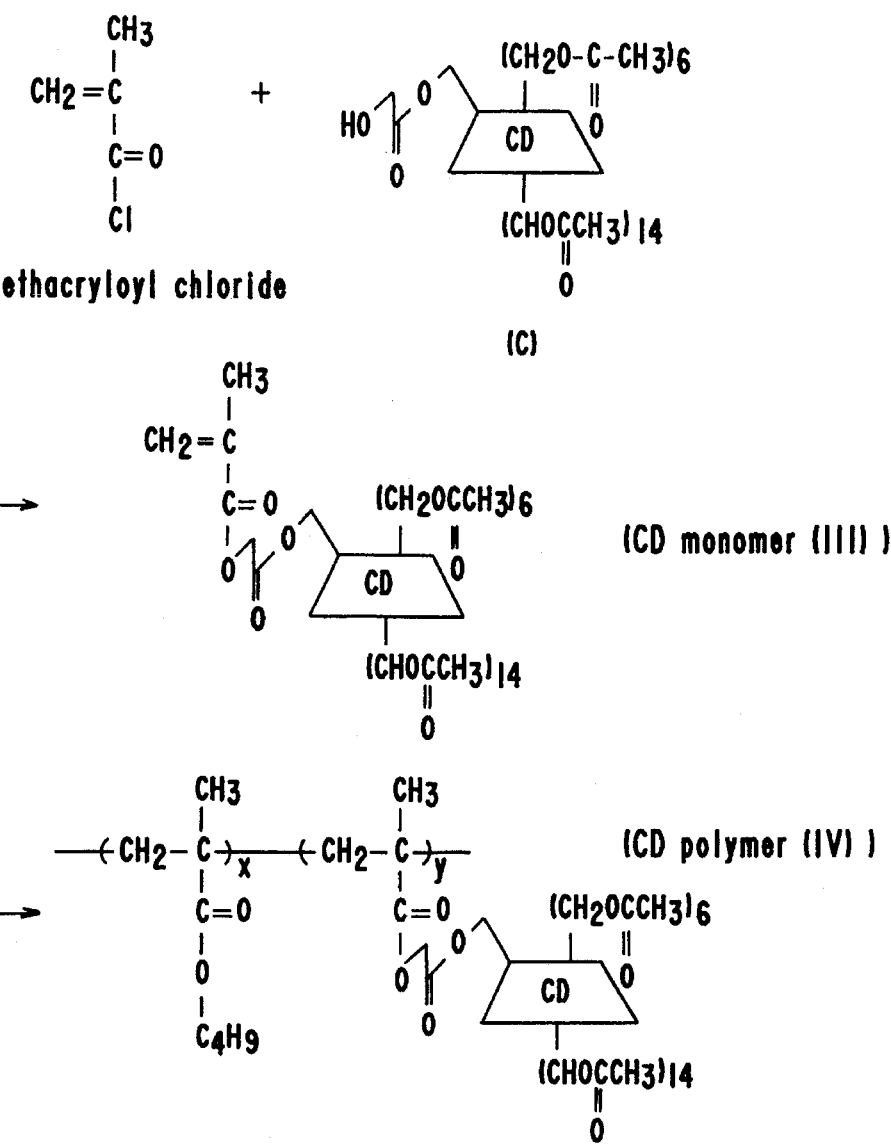
Figure 2C:
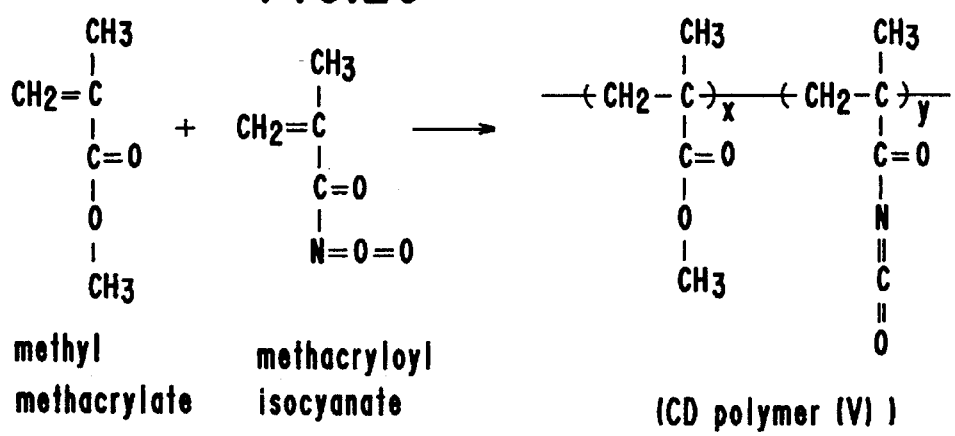

The reaction for synthesizing the polymers containing immobilized CD as shown in FIG. 2 is carried out as follows:

1. Methacryloyl isocyanate is dissolved in anhydrous THF and cooled to 0°-5° C. under nitrogen stream. To the mixture thus obtained, Compound (A) (R: CH₃-) dissolved in THF is slowly added dropwise.

After the dropwise addition, the mixture is stirred at that temperature for 1 h. After the reaction, the mixture is left standing to cool to room temperature and the solvent is distilled off under reduced pressure at a temperature not exceeding 30° C., and the residue is dried to give CD monomer (I).

The monomer (I) and methyl methacrylate are subjected to copolymerization in dioxane at 80° C. for 8 h using azobisisobutyronitrile (AIBN) as an initiator. After the reaction, the mixture is added to a large amount of methanol for reprecipitation. The precipitate is washed thoroughly with methanol and dried to give CD polymer (II).

2. Compound (C) (R':

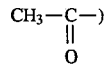

is dissolved in anhydrous benzene and triethylamine is then added, and the mixture is cooled to 0°-5° C. under nitrogen stream. Methacryloyl chloride is slowly added dropwise to the resulting mixture. After the dropwise addition, the mixture is stirred at 0°-5° C. 5° C. for 1 h, then at room temperature for 3 h. After the reaction, the mixture is extracted with a diethyl ether/water system and the ethereal layer is neutralized and washed, and ether is distilled off under reduced pressure at 30° C. and below. The residue is dried to afford CD monomer (III).

The monomer (III) thus obtained and n-butyl methacrylate are subjected to copolymerization in benzene at 60° C. for 8 h using AIBN as an initiator. After the reaction, the mixture is added to a large amount of methanol for reprecipitation. The precipitate is washed thoroughly with methanol and dried to give CD polymer (IV).

3. Methyl methacrylate and methacryloyl isocyanate are subjected to copolymerization in butyl acetate at 80° C. for 5 h under nitrogen stream using AIBN as an initiator, whereby Polymer (V) is formed. Thereafter, the mixture is allowed to cool to room temperature and the mixture is further cooled to 0°-5° C., followed by dropwise addition of Compound (A) (R: CH₃—) dissolved in butyl acetate. After dropwise addition, the mixture is stirred at 0°-5° C. for 5 h. Subsequently, unreacted isocyanate group is reacted with methanol. Reprecipitation from a large amount of acetone is effected and the precipitate is washed thoroughly with acetone and dried to give CD polymer (VI).

4. Monohydroxy β-CD methylated product is dissolved in anhydrous benzene and to the mixture, triethylamine is added, followed by cooling to 0°-5° C. under nitrogen stream. Methacryloyl chloride is slowly added dropwise to the resulting mixture. After the dropwise addition, the mixture is stirred at 0°-5° C. for 1 h, then at room temperature for 3 h. After the reaction, the mixture is extracted with a diethyl ether/water system and the ethereal layer is neutralized and washed, then ether is distilled off under reduced pressure at a temperature not exceeding 30° C. The residue is dried to give a CD monomer.

The monomer thus obtained and methyl methacrylate are subjected to copolymerization in benzene at 60° C. for 8 h using AIBN as an initiator. After the reaction, the mixture is added to a large amount of methanol for reprecipitation. The precipitate is washed thoroughly with methanol and dried to afford a CD polymer.

5. Methyl methacrylate and methacryloyl chloride are subjected to copolymerization in benzene at 80° C. for 5 h under nitrogen stream using AIBN as an initiator to form a polymer. The reaction mixture is allowed to cool to room temperature and, after the addition of triethylamine, the mixture is cooled to 0°–5° C. and monohydroxy β-CD methylated product dissolved in benzene is added dropwise. After the dropwise addition, the reaction is continued at room temperature for 6 h followed by treatment with diazomethane, to attack any unreacted terminal group

Then reprecipitation from a large amount of acetone, washing thoroughly with acetone and drying affords CD polymer.

As described above in detail, there can be provided CD derivatives which can be used as a starting material for a polymer having immobilized CD and which have only one protected hydroxyl group in CD, in accordance with the present invention. Further in the present invention, the immobilization can be performed efficiently because the reactivity between an acid halide or isocyanate with an alcohol is high. In addition, one unit of CD derivative can reliably be immobilized with respect to a monomer such as an acid halide, so there can be provided a process for producing a polymer which can easily be quantitatively determined.

Industrial Applicability

The polymers having immobilized CD as obtained in the manner described above are used either as a packing for chromatographic separation, as a catalyst or for various purposes such as for masking the off-taste of foul smell of foods, for retaining volatile materials or for solubilizing sparingly soluble materials.

I claim:

1. A process for producing a cyclodextrin-immobilized polymer, comprising (i) reacting cyclodextrin (CD) with a protecting agent having a protective group, said protecting agent being a member selected from the group consisting of a carboxylic acid halide, an acid anhydride, and a compound conforming to one of the formulae listed below:

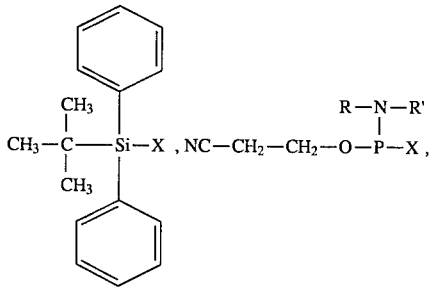

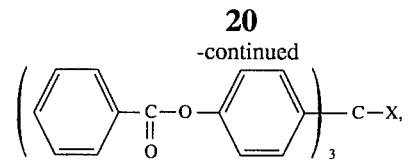

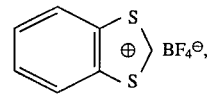

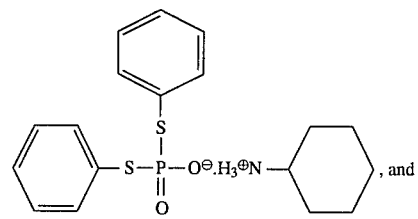

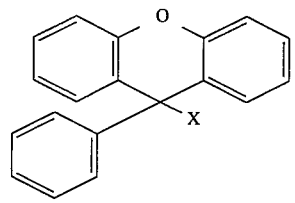

wherein
X is Cl, Br or I; and
R and R' each represents an isopropyl group, a phenyl group or a benzyl group, thereby producing a protected cyclodextrin derivative having a single protected primary hydroxyl group;

(ii) contacting said protected cyclodextrin derivative with a blocking agent having a blocking group, said blocking group being selected from the group consisting of

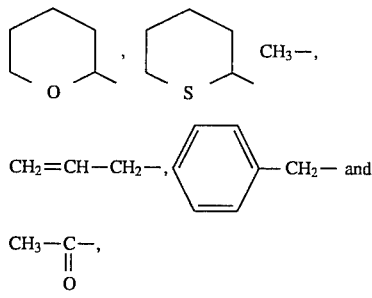

thereby producing a blocked and protected cyclodextrin derivative having a single protected primary hydroxyl group and having all of its remaining primary hydroxyl groups and all of its secondary hydroxyl groups blocked by said blocking group;

(iii) removing said protective group from said blocked and protected cyclodextrin derivative to produce a blocked cyclodextrin derivative having a single, unprotected primary hydroxyl group and having all of its remaining primary hydroxyl groups and all of its secondary hydroxyl groups blocked by said blocking group;

(iv) reacting the single, unprotected primary hydroxyl group of said blocked cyclodextrin derivative with a polymerizable monomer selected from the group consisting of an acid halide monomer of an α,β-unsaturated acid, a derivative thereof, an α,β-unsaturated acid monomer having a terminal isocyanate group, and a derivative thereof, to produce a cyclodextrin monomer having all of its remaining primary hydroxyl groups and all of its secondary hydroxyl groups blocked by said blocking group;

(v) copolymerizing said cyclodextrin monomer with a second polymerizable monomer, thereby producing a cyclodextrin-immobilized polymer.

2. A process for producing a cyclodextrin-immobilized polymer, comprising (i) iodinating a single primary hydroxyl group of cyclodextrin, thereby producing an iodinated cyclodextrin;

(ii) reacting the iodinated cyclodextrin with a member selected from the group consisting of an alcoholamine, a mercaptoalcohol, glycolic acid, and a compound conforming one of the following formulae in order to introduce a protective group into a single primary hydroxyl group in the cyclodextrin R—O—(CH$_2$)$_m$—OH wherein
R represents

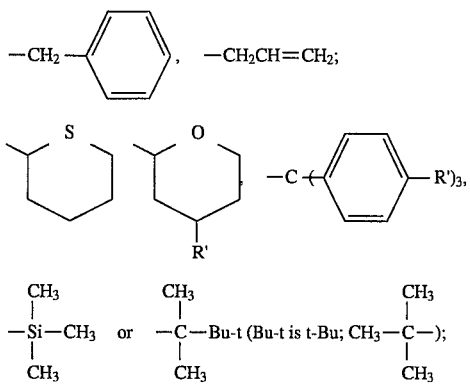

R' represents a hydrogen atom or —OCH$_3$;
m is an integer of 2–10;

thereby producing a protected cyclodextrin derivative having a single protected primary hydroxyl group;

(iii) contacting said protected cyclodextrin derivative with a blocking agent having a blocking group, said blocking group being selected from the group consisting of

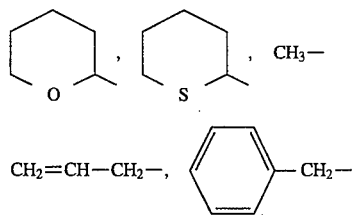

and 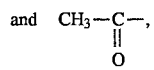

thereby producing a blocked and protected cyclodextrin derivative having a single protected primary hydroxyl group and having all of its remaining primary hydroxyl groups and all of its secondary hydroxyl groups blocked by said blocking group;

(iv) removing said protecting group from said blocked and protected cyclodextrin derivative to produce a blocked cyclodextrin derivative having a single, unprotected primary hydroxyl group and having all of its remaining primary hydroxyl groups and all of its secondary hydroxyl groups blocked by said blocking group;

(v) reacting the single, unprotected primary hydroxyl group of said blocked cyclodextrin derivative with a polymerizable monomer selected from the group consisting of an acid halide monomer of an α,β-unsaturated acid, a derivative thereof, an α,β-unsaturated acid monomer having a terminal isocyanate group, and a derivative thereof, to produce a cyclodextrin monomer having all of its remaining primary hydroxyl groups and all of its secondary hydroxyl groups blocked by said blocking group;

(vi) copolymerizing said cyclodextrin monomer with a second polymerizable monomer, thereby producing a cyclodextrin-immobilized polymer.

3. A process for producing a cyclodextrin-immobilized polymer, comprising (i) iodinating a single primary hydroxyl group of cyclodextrin, thereby producing an iodinated cyclodextrin;

(ii) reacting the iodinated cyclodextrin with a member selected from the group consisting of a compound conforming one of the following formulae in order to introduce a protective group into a single primary hydroxyl group in the cyclodextrin:

R—(—CH$_2$)$_m$—OH wherein
R is

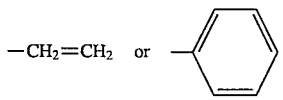

m is an integer of 1–10; and

wherein R represents a hydrogen atom or —OCH$_3$, thereby producing a protected cyclodextrin derivative having a single protected primary hydroxyl group;

(iii) contacting said protected cyclodextrin derivative with a blocking agent having a blocking group, said blocking agent being selected from the group consisting of

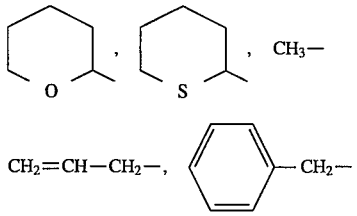

and, 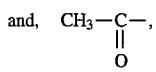

thereby producing a blocked and protected cyclodextrin derivative having a single protected primary hydroxyl group and having all of its remaining primary hydroxyl groups and all of its secondary hydroxyl groups blocked by said blocking group;

(iv) removing said protective group from said blocked and protected cyclodextrin derivative to produce a blocked cyclodextrin derivative having a single, unprotected primary hydroxyl group and having all of its remaining primary hydroxyl groups and all of its secondary hydroxyl groups blocked by said blocking group;

(v) reacting the single, unprotected primary hydroxyl group of said blocked cyclodextrin derivative with a polymerizable monomer selected from the group consisting of an acid halide monomer of an α/β-unsaturated acid, a derivative thereof, an α,β-unsaturated acid monomer having a terminal isocyanate group, and a derivative thereof, to produce a cyclodextrin monomer having all of its remaining primary hydroxyl groups and all of its secondary hydroxyl groups blocked by said blocking group;

(vi) copolymerizing said cyclodextrin monomer with a second polymerizable monomer, thereby producing a cyclodextrin immobilized polymer.

4. The process of claim 1, wherein said protecting agent is a carboxylic acid halide selected from the group consisting of allyoxycarbonyl chloride, p-nitro-phenoxycarbonyl chloride, benzyloxycarbonyl chloride, benzylthiocarbonyl chloride, trichloroethoxycarbonyl chloride and tribromoethoxycarbonyl chloride.

5. The process of claims 2 or 3, wherein said iodinated cyclodextrin is prepared by reacting cyclodextrin with para-toluenesulfonyl chloride to produce an intermediate which is then reacted with potassium iodide.

6. The process of claims 1, 2 or 3, wherein said second polymerizable monomer is a member selected from the group consisting of methyl methacrylate and n-butyl methacrylate.

7. The process of claims 1 or 3, wherein said acid halide monomer of an α,β-unsaturated acid is methacryloyl chloride.

8. The process of claims 2 or 3, wherein said α,β-unsaturated acid monomer having a terminal isocyanate group is methacryloyl isocyanate.

9. A process for producing a cyclodextrin-immobilized polymer by copolymerizing at least one polymerizable monomer selected from the group consisting of a salt of an α,β-unsaturated acid, a derivative thereof, an α,β-unsaturated acid having a terminal isocyanate group and a derivative thereof with another polymerizable monomer to form a polymer and subsequently reacting said polymer with a blocked cyclodextrin derivative having a single, unprotected primary hydroxyl group and having all of its remaining primary hydroxyl groups and all of its secondary hydroxyl groups blocked by a blocking group.

* * * * *